United States Patent
Schmidt et al.

(10) Patent No.: US 10,415,243 B2
(45) Date of Patent: Sep. 17, 2019

(54) CONNECTING ELEMENT FOR WALL COMPONENTS

(71) Applicant: Gebr. Schmidt GBR, Gütersloh (DE)

(72) Inventors: Andreas Schmidt, Bielefeld (DE); Uwe-Volker Schmidt, Bielefeld (DE); Hans-Ulrich Schmidt, Steinhagen (DE); Dieter Schmidt, Steinhagen (DE)

(73) Assignee: Gebr. Schmidt GbR, Gütersloh (DE)

( * ) Notice: Subject to any disclaimer, the term of this patent is extended or adjusted under 35 U.S.C. 154(b) by 0 days.

(21) Appl. No.: 15/580,154

(22) PCT Filed: Apr. 30, 2016

(86) PCT No.: PCT/DE2016/000189
§ 371 (c)(1),
(2) Date: Dec. 6, 2017

(87) PCT Pub. No.: WO2016/198034
PCT Pub. Date: Dec. 15, 2016

(65) Prior Publication Data
US 2018/0142468 A1    May 24, 2018

(30) Foreign Application Priority Data
Jun. 10, 2015   (DE) .................. 10 2015 007 267

(51) Int. Cl.
*E04B 2/74*   (2006.01)
*E04B 1/26*   (2006.01)
*E04B 2/72*   (2006.01)

(52) U.S. Cl.
CPC .......... *E04B 2/7457* (2013.01); *E04B 1/2608* (2013.01); *E04B 2002/726* (2013.01)

(58) Field of Classification Search
CPC ............ E04B 2/7457; E04B 2002/726; E04B 1/2608; F16B 5/06
(Continued)

(56) References Cited

U.S. PATENT DOCUMENTS 523,359 A * 7/1894 Leicht ................... E04B 1/2608
52/715
1,547,184 A * 7/1925 Venzie .................. E04F 13/045
52/355
(Continued)

FOREIGN PATENT DOCUMENTS

DE    1790171 U    6/1959
DE    7313323 U    7/1973
(Continued)

*Primary Examiner* — Brent W Herring
(74) *Attorney, Agent, or Firm* — Husch Blackwell LLP

(57) ABSTRACT

Panel-shaped components are used for interior construction, e.g., for covering walls, ceilings and/or fabricating light-weight walls. Connecting elements are used during the assembly of such wall components. A connecting element is suitable for connecting several such wall components with each other, thereby greatly simplifying the assembly of wall components above all with respect to handling, and increasing the stability of such a wall. For this reason, such a connecting element has two U-shaped profiles offset to each other, which can accommodate at least two wall components, preferably plasterboards, whose narrow sides abut against each other. The non-positive connection between the connecting element and a wall component is established according to the invention using pop rivets or the known drywall screws.

8 Claims, 9 Drawing Sheets

(58) Field of Classification Search
USPC .................... 52/712, 715, 285.3, 582.1
See application file for complete search history.

(56) References Cited

U.S. PATENT DOCUMENTS

| | | | | |
|---|---|---|---|---|
| 1,905,616 | A * | 4/1933 | Apollony | E04G 17/02 249/219.1 |
| 1,931,739 | A * | 10/1933 | Rutten | B65D 90/08 52/245 |
| 2,025,794 | A * | 12/1935 | Venzie | E04B 2/58 52/355 |
| 2,084,758 | A * | 6/1937 | Anderson | E06B 3/984 403/231 |
| 2,181,698 | A * | 11/1939 | Langenberg | E04B 1/4185 52/258 |
| 2,258,574 | A * | 10/1941 | Leary | E04B 2/842 52/285.3 |
| 2,259,594 | A | 10/1941 | Venzie | |
| 2,263,795 | A * | 11/1941 | Balduf | E04F 13/0821 24/327 |
| 2,296,609 | A * | 9/1942 | Gibson | E04B 2/58 24/339 |
| 2,340,924 | A * | 2/1944 | Boye | E06B 3/9845 403/283 |
| 2,351,525 | A * | 6/1944 | Leary | E04B 2/842 403/231 |
| 3,357,148 | A * | 12/1967 | Turner | E04B 2/58 52/357 |
| 3,398,982 | A * | 8/1968 | Venzie, Jr. | E04F 13/045 52/489.1 |
| 4,410,294 | A * | 10/1983 | Gilb | E04B 1/2612 403/232.1 |
| 5,004,369 | A * | 4/1991 | Young | E04B 1/2612 403/232.1 |
| 5,217,317 | A * | 6/1993 | Young | E04B 1/2612 403/14 |
| 5,351,457 | A * | 10/1994 | Colen | E04B 2/10 52/438 |
| 5,467,566 | A | 11/1995 | Swartz et al. | |
| 5,653,079 | A * | 8/1997 | Loeffler | E04B 1/2608 403/396 |
| 6,209,268 | B1 * | 4/2001 | Schmidt | E04B 1/2608 52/665 |
| 6,367,216 | B1 * | 4/2002 | Maylon | E04B 2/7457 411/457 |
| 6,415,575 | B1 * | 7/2002 | Thompson | E04B 1/2608 52/712 |
| 6,763,634 | B1 * | 7/2004 | Thompson | E04B 7/045 52/167.1 |
| 7,293,390 | B2 * | 11/2007 | Roesset | E04B 7/045 52/702 |
| 7,503,148 | B2 * | 3/2009 | Lin | E04B 1/2608 248/300 |
| 7,549,262 | B2 * | 6/2009 | Roessett | E04B 7/045 52/702 |
| 8,484,927 | B2 * | 7/2013 | Nguyen | E04B 7/063 52/714 |
| 9,045,895 | B1 * | 6/2015 | Lin | F16B 15/0053 |
| 2007/0044421 | A1 * | 3/2007 | Nguyen | E04B 7/063 52/698 |
| 2008/0209845 | A1 * | 9/2008 | Lin | E04B 1/2608 52/712 |
| 2009/0282768 | A1 * | 11/2009 | Noturno | E04D 12/00 52/582.1 |
| 2017/0009444 | A1 * | 1/2017 | Downs | B25C 7/00 |

FOREIGN PATENT DOCUMENTS

| | | |
|---|---|---|
| DE | 3502918 U1 | 5/1985 |
| DE | 29703632 U1 | 5/1997 |
| DE | 29707800 U1 | 8/1997 |
| DE | 29922142 U1 | 4/2000 |
| DE | 10015124 A1 | 10/2001 |
| DE | 20304627 U1 | 7/2003 |
| DE | 202004012417 U1 | 11/2004 |
| DE | 202005011212 U1 | 2/2006 |
| DE | 202016002862 U1 | 7/2016 |
| WO | 98/04841 | 2/1998 |

\* cited by examiner

CONNECTING ELEMENT FOR WALL COMPONENTS

CROSS REFERENCE

This application claims priority to PCT Patent Application No. PCT/DE2016/000189, filed 30 Apr. 2016, which itself claims priority to German Application No. 10 2015 007267.6, filed 10 Jun. 2015, the entirety of both of which are hereby incorporated by reference.

FIELD OF THE INVENTION

The present invention relates overall to the field of general building construction, comprised predominantly of panel-shaped supporting and non-supporting elements. These panel-shaped components are used for interior construction, e.g., for covering walls, ceilings and/or fabricating lightweight walls. The panel-shaped components are referred to below as wall components, without this imposing any kind of limitation. Connecting elements are used for connecting such wall components.

The present invention relates to such a connecting element for non-positively connecting at least two wall components, wherein the integral connecting element made out of a sheet metal part is shaped like a double-U, which is comprised of two offset and opposing U-profiles having a shared web, wherein a U-profile consists of a respective two legs that are spaced apart by a web and extend from the web in a perpendicular direction and in a direction 180 degrees away from each other.

BACKGROUND OF THE INVENTION

Connecting elements for non-positively connecting two wall components are known from prior art. For the wall components, the so-called drywall represents the most common wall type for the interior construction of buildings. A drywall can be erected with the help of a substructure consisting of roof battens or the like, or of metal profiles (metal studding) or wooden stands (wood studding) with various building panels. Building panels can consist of OSB panels (with or without insulation), chipboards, MDF panels and plasterboards (GKB according to DIN EN 520), earlier referred to as gypsum board panels, without tongue and groove. Depending on the configuration, such a drywall can satisfy the different requirements. For example, plasterboards for erecting a plasterboard wall are placed on top of and/or next to each other with their narrow sides, and fastened to one of the aforementioned substructures consisting of wood or galvanized steel profiles. The wall components can be fastened to a substructure using various fasteners, for example plasterboard staples or plasterboard nails, but advantageously using a screw fastening. The plasterboards are fastened to a substructure with screws using so-called drywall screws (e.g., plasterboard screws with bugle head) as self-tapping sheet metal screws. The joints of the plasterboards placed against each other and the screw heads are filled with putty to form a smooth surface, and then sanded. DIN 18182 lists the accessories needed for connecting such wall components made of plasterboards, such as the drywall screws, brackets and nails. However, it does not contain other connecting elements.

In order to assemble the relatively large formats of the plasterboards, whose standard width measures between 600 mm and up to 1250 mm, whose standard length measures between 2000 mm and up to 4000 mm, and whose standard thickness measures between 9.5 mm and 25 mm, use is made of the various aforementioned connecting elements from prior art, industry and trade. Craftsmanship is essential when fastening such wall components, since the fastening points, i.e., the brackets, nails and/or drywall screws, are no longer to be visible once a wall has been completed on the one hand, but the screws can be pulled through a plasterboard given thin walls on the other. In addition, a bracketed, nailed or screwed connection between a plasterboard and the substructure does not constitute a non-positive connection, so that more fasteners must be placed. However, hiding all fasteners completely is thus often unfeasible on the one hand, and associated with significant costs on the other. If a bracket, a nail and/or a drywall screw has in turn penetrated too deeply or even penetrated almost all the way through a plasterboard on a longitudinal and/or transverse edge, the edge of the plasterboard can easily break, because the fasteners must also be arranged directly on the narrow longitudinal and/or transverse edges of the plasterboard. In addition, the installation or assembly of especially large-surfaced plasterboards is impossible without a second person in the joining process. The fastening of wall components is even more disadvantageous during assembly if a substructure cannot be secured in the edge area of the wall components or wallboards because of a structural incident. For example, the lack of bolting capacity results in subsequent defects. The wall components laid on top of and/or next to each other on the narrow sides form joints at the laid out locations, which are filled with putty after assembly. If the fasteners are absent in the edge area of these joints for lack of a substructure, expansion cracks can arise on these joint seams. In addition, the wall components are very unwieldy owing to their size, and are thus not laid out and fastened or installed alone.

To further simplify the assembly of wall components, DE 7313323 U hence discloses a bracket for the concealed fastening of panels. However, assembling a panel requires that the brackets be fastened to the substructure beforehand by means of screws or nails. Only after the brackets have been secured to the substructure can the panel be pushed between the legs of the U-profile of the bracket. Such a bracket can also be designed as an elongated, double-T-shaped profile, the T-leg of which must again be fastened to the substructure for accommodating a panel. The disadvantage to this embodiment for brackets is that the later can only be used in conjunction with a substructure, and that it is often difficult and time-consuming to secure the individual brackets on the mounting rail, which is most often already fastened to the wall, and above all to arrange these brackets at a desired location. However, as soon as a substructure is not available at the connection points of the panels, the brackets cannot be inserted or used. Because a non-positive connection between neighboring wall components does not exist, expansion cracks can arise on the joints. Another disadvantage lies in the fact that a wall component can be inserted into the U-shaped opening of the bracket only after a bracket has been secured to the substructure.

To improve usability, DE 297 03 632 U1 thus proposes a retaining and compensating element for accommodating wall covering parts, which can be easily secured to the substructure. However, even this embodiment for a bracket or connecting element with a U-profile for accommodating a wall component has the disadvantage that it can only be used in conjunction with a substructure. It here also holds true that a non-positive connection between neighboring wall components does not exist in the absence of a substructure in the edge area of the wall components, so that expansion cracks can arise on the joints. Another disadvantage lies in the fact that such retaining and compensating elements are not suitable for accommodating a wall component on both sides. Another disadvantage lies in the fact that a wall component can be inserted into the U-shaped opening of the bracket only after a bracket has been secured to the substructure.

For this reason, DE 2004 012 417 U2 describes U-shaped connecting pieces for connecting two wall components with two panel-shaped legs lying opposite each other and a panel-shaped web that connects the two legs, wherein the web has connection means. The connection means make it possible to assemble two identical, U-shaped connecting pieces to form a new connecting piece, which thereby assumes the shape of an H. For example, if a craftsman wished to connect two, three or four wall components with each other, he or she can assemble two U-shaped connecting pieces, so that they form an H-shaped connecting piece that is suitable for accommodating two wall components. It was disadvantageously found that such connecting pieces are not suitable for joining together plasterboards with a thickness of 9.5 mm to 25 mm, because the webs are essentially too wide to accommodate such narrow building panels given the arranged tabs and bulges. Another disadvantage is that, owing to the two webs abutting against each other and their bulges and tabs, the distance between two abutting building panels, in particular plasterboards, becomes too great.

Another example for such a connecting element or connecting piece can be found in publication DE 203 04 627 U1, which is regarded as most obvious prior art. This system does without fasteners such as screws and nails, but does require different connecting pieces for the various intended applications. U-shaped connecting pieces are normally used in the edge area of a drywall, for example in the area of the floor and/or ceiling of a room, while H-shaped connecting pieces are used in other areas of the drywall. DE 203 04 627 U1 discloses connecting pieces for joining wall components that have two building panels with insulation material arranged between the latter, wherein the connecting pieces are U- or H-shaped in design, i.e., have opposing panel-shaped legs a panel-shaped web that joins the legs. The connecting pieces are designed in such a way that the panel-shaped legs can be introduced into the area between the building panel and insulation material, making it possible to put together several wall components to yield a drywall in this way. In particular connecting pieces with a double-U shape are suitable for this purpose. Visible on FIG. 3 is an offset, double-U-shaped connecting piece, several of which according to FIG. 5 are used on the ceiling of a room in an arrangement for fastening two wall components. These connecting pieces join the wall components together. In such an arrangement comprised of at least two wall components that are joined together by one or several connecting pieces, with neither the building panel nor the material having a recess to accommodate connecting pieces, the wall components consisting of at least two building panels are provided with an insulation layer arranged between the building panels. Such a wall component is referred to as a composite panel, and thus has a specific thickness stemming from the two building panels and above all from the insulating panel. The connecting piece is configured in such a way that it can encompass an insulating panel, as visible on FIG. 6 and FIG. 7. The disadvantage to this embodiment is that the connecting piece is not suitable for assembling individual wall components on the narrow sides, in particular plasterboards, for assembling a plasterboard wall. These connecting pieces can only be used given a double paneling with an interspersed insulation layer, because a connecting piece encompasses the insulating material at the edge on the one hand, and is inserted between the two wall components, in particular the plasterboards, on the other. A fixed connection between the wall components and a connecting piece is only established when using drywall screws.

SUMMARY OF THE INVENTION

One object of the present invention involves further improving and simplifying the connection of wall components by means of connecting elements of the kind mentioned at the outset, avoiding the aforementioned disadvantages to the known arrangements from prior art, and indicating a technical solution. The technical solution to the object involves ensuring the "integrality" of the connecting element, enabling a "bilateral" accommodation of the wall component, preferably a plasterboard, and "avoiding the securing of connecting elements to a substructure". In other words, the connecting element is to be used independently of a substructure, and still achieve stability between wall components made to abut against each other, so as to avoid expansion cracks. Summarizing, it can be stated that most of the connecting elements known from prior art establish a connection between a wall component and a substructure. However, the invention involves joining wall components to each other, while not joining them to a substructure. The new connecting elements are intended to increase the stability of a drywall or plasterboard wall and greatly simplify assembly.

Therefore, other objects of the present invention involve further developing a connecting element of the kind mentioned at the outset so as to make it easy and cost-effective to manufacture, and greatly simplify the handling of wall components, preferably a plasterboard, with a few simple hand movements. It is to be possible to fasten such connecting elements to wall components in any position to the narrow sides or abutting edges of the longitudinal and/or transverse direction of a wall component. The wall component or wall panel can basically be any type of building panel used in drywall construction. The inventive connecting elements make it possible to assemble several wall components, preferably plasterboards, in a one-man operation. Above all roof extensions and suspended ceilings are to enable assembly in a one-man operation, and thus a reduction in personnel. The connection of wall components is to be simplified around windows, doors and other openings. In other words, the inventive connecting elements are to make it significantly easier to assemble wall components.

The features in claim 1 describe the technical solution for such a connecting element for joining together at least two wall components. Advantageous embodiments and further developments of the invention may be gleaned from the following subclaims and specification, with reference to the attached drawings.

The simple and cost-effective production is achieved by advantageously having the connecting element consist of a flat, punched part made out of sheet steel with a thickness of 0.1 mm to 2 mm, preferably out of thin sheets with a thickness of 0.2 mm to 0.5 mm. The properties of fine sheet are determined by the steel grade, which in turn depends on the conditions under which the connecting element is used, e.g., good punching and bending properties, along with a specific strength and stiffness. The properties are here required as a flat product for punching and cold forming or bending and embossing. In principle, sheet metals are bent and embossed by folding over a flat part relative to the remaining flat part, as will be explained in more detail later. After the fine sheet has been punched, the connecting element advantageously has a geometric contour, which has a horizontal and vertical center line, wherein the geometric contour can have a pentagonal, quadrangular, triangular or circular shape, preferably a quadrangular or rectangular shape. The shape of the punched part is preferably symmetrical in design, see FIG. 1a. The perpendicular center line of the contour runs in the plane of the web, while the horizontal center line runs perpendicular to the plane of the web. The progression of the horizontal center line is later advantageously identical with one of the edges on the U-shaped profiles, which at one location are connected with the web. In addition, the contour of the punched part advantageously has only two punched cuts. The punched cuts run centrally to the contour and from the outer edge until almost the center of the punched part. The punched cuts preferably run on a continuous line, preferably the horizontal center line.

In other words, it is demonstrated that a geometric contour, advantageously two of them, on a continuous line each contain punched cuts that run from an outer edge toward the center of the punching part, are spaced apart from each other, and are arranged centrally relative to the contour of the connecting element. The distance between the punched cuts advantageously yields a web width that corresponds to the thickness of a wall component. The thickness of a wall component, preferably a plasterboard, is standardized, for example corresponding to a thickness of 9.5 mm, 12.5 mm, 15 mm, 18 mm or 20 mm. In other words, a connecting element with the corresponding width of a web is provided for each thickness of a wall component, wherein the area size of the U-shaped legs can remain identical. The same holds true for the thickness of a chipboard, etc., so that a plurality of connecting elements can be offered on the market to cover the demand during the assembly of wall components. The straightforward assembly of a connecting element through the simple insertion onto a narrow longitudinal and/or transverse edge of a wall component and the easy fastening of a connecting element to a wall component using rivets, preferably of pop rivets with a countersunk head according to DIN 7337, enables an easy and single laying of wall components by a craftsman. In addition, the strength and stability of wall components is simultaneously advantageously increased in relation to each other, thereby avoiding subsequent expansion cracks on the joints.

The progression of the web width in a perpendicular direction to the punched cuts forms the web of the connecting element. Since the web is relatively narrow due to the slight thickness of the wall components, a lower bending strength arises in the area of the distance on the line on which the two spaced apart punched cuts are arranged and establish a distance between each other. In order to increase the stiffness of the web and connecting element, the web is advantageously designed with a channel-shaped recess along the web, referred to by the expert as a bead. The bead is arranged perpendicular to the imaginary line between the two punched cuts and symmetrically in the web. The length of the channel-shaped recess (bead) in the web corresponds to between 20% and 80% of the overall length of the connecting element, and thus runs in the web of the two U-shaped profiles.

The fact that the connecting element according to claim 1 is a punched sheet metal part, for example made out of galvanized sheet steel or stainless spring steel, yields a cost-effective production method in a flat form. Such a punched part can be suitably punched, chamfered and embossed on prescribed lines, resulting in a connecting element that is ready for installation. Two punched cuts run centrally to the contour, but not continuously. A respective bending line extends at the end of the two converging punched cuts. The two bending lines run perpendicular to the punched cuts up to the two outer edges of the contour, wherein the two bending lines are spaced parallel apart around a perpendicular center line. The distance between the bending lines forms the width of the shared web of the legs, which are arranged above and below the punched cuts. In principle, the metal sheets are bent by folding over a flat part opposing the remaining flat part. Four flat parts are folded over at the two aforementioned bending lines, wherein bending represents a molding manufacturing method that produces a permanent deformation, here of two U-profiles. The remaining flat part comprises the shared web of the two U-profiles.

The two bending lines and the two punched cuts form four flat quadrants I, II, III, IV, wherein each quadrant I, II, III, IV corresponds to a flat part. The flat parts form the foldable areas, which comprise a respective leg of the U-profile after chamfering. Between the two parallel, spaced apart bending lines, the remaining flat part, the fixed flat part, turns into a narrow web, which is designed with a bead to increase the strength (stiffness), as described.

According to claim 4, each quadrant I-IV of a flat part incorporates at least one punched hole, preferably two punched holes per flat part. In other words, a total of eight punched holes are arranged in the punched part. A plurality of punched holes in a connecting element would normally make no sense or offer any additional use, because it is entirely sufficient to fasten a connecting element to a wall component with a respective two rivets owing to the parallel surface pressure of the legs on the wall component. Another benefit to a higher number of punched holes could arise from a situation where a connecting element is assembled to a wall element. Such an assembly situation could arise while securing a connecting element to a corner of a wall element. Given a plurality of punched holes in the U-profile of a connecting element, it makes sense to select two punched holes for connection with a wall element that are located the furthest away from an outer edge of a wall element.

A respective four of the preferably eight punched holes are spaced parallel apart from the web, and hence from the perpendicular center line of the punched part, wherein a respective two punched holes are located in a quadrant I-IV of a flat part. The distance between the punched holes and web measures at least 10 mm, and at most 35 mm, preferably approx. 22 mm. The punched holes are arranged roughly on the perpendicular center lines of the flat parts, preferably closer to the perpendicular outer edges. The center lines of the flat parts run spaced parallel apart from the web. By contrast, the distance between the punched holes and horizontal outer edges of the flat parts measures roughly between 6 mm and 15 mm, preferably approx. 10 mm, so that the distance between two punched holes in a flat part can measure approx. 30 mm. These dimensions relate to a flat part with a size of approx. 40 mm×50 mm, at a web width for wall elements in a thickness of 9.5 mm to 18 mm. If a flat part should assume other, e.g., larger dimensions, the distances between the punched holes would inevitably change. The two punched holes in quadrant I are always flush with the two punched holes in quadrant II, and the two punched holes in quadrant II are always flush with the two punched holes in quadrant IV. In other words, after the bending process or after folding over the flat parts that subsequently form the legs of the U-shaped profiles, these punched holes always lie perpendicularly over each other, spaced apart only by the web. The punched holes lying opposite each other in quadrants I and II as well as III and IV each form a pair of punched holes, wherein each pair has a shared center line. Based upon the above example, two pairs of punched holes lying perpendicularly opposite each other thus arise per U-shaped profile. The punched holes are spaced apart only by a web, and arranged in the legs situated parallel to each other. In addition, the punched holes in quadrants I and IV are arranged on a shared center line, as are the punched holes in quadrants II and III. Four punched holes are arranged on each of these center lines, wherein two center lines are here involved. These two center lines are spaced parallel apart from the perpendicular center line of the punched part and to the perpendicular outer edges. A respective bending line is arranged on either side next to the perpendicular center line, and runs parallel to the center line. The center lines of the punched holes are spaced parallel apart from these bending lines. Even from a horizontal standpoint, the punched holes have a center line. The number of punched holes results in four horizontal center lines. Arranged on each center line are two punched holes, wherein each of these punched holes forms a punched hole pair. These four horizontal center lines are arranged parallel to the horizontal center line of the punched part and symmetrical thereto, and also to the outer edges of the punched part. In addition, the horizontal center lines of the punched holes are spaced a specific distance apart from the horizontal center line of the punched part. If a plurality of punched holes are contained in the punched part, there is of course also a plurality of perpendicular and horizontal center lines on which the punched holes are arranged, advantageously each symmetrically around the perpendicular and horizontal center line of the punched part.

However, in order to obtain a simple and non-positive connection between a connecting element and a wall component, the wall component is to be fastened between the legs of the U-shaped profiles. According to the invention, fastening is to take place with rivets, preferably with pop rivets having a countersunk head. The advantage to using pop rivets with a countersunk head as the non-positive fastener is that the countersunk head does not protrude out of the surface of the wall components. To this end, the invention requires that a respective punched hole receive a depression from a pair of punched holes. The size of the depression corresponds with the dimensions of the countersunk head of the pop rivet. In other words, the size of the depression angle on the punched hole in the flat part corresponds to the angle of the pop rivet head, i.e., also 120 degrees. The depth of the depression in the punched part is designed so as to ensure that the countersunk head of the pop rivet is perfectly recessed, and does not protrude out of the surface of the connecting element. In addition, the size advantageously proposed for a pop rivet makes it possible to fasten the various thicknesses of the wall components in the connecting elements. One and the same pop rivet with a diameter of 4.8 mm can be used to secure wall thicknesses of wall components ranging from 6 mm to 20 mm. Given a countersunk head diameter of 9 mm and a countersink depth of 1.2 mm for a 4.8 mm pop rivet, a curvature can form behind the punched hole owing to the embossing process. If the thickness of the punched part changes, so too does the size of the curvature. In this case, the curvature serves as a first fastening of the connecting element on a wall element, because the curvature partially reduces the distance between the two U-shaped legs. Therefore, the curvatures on punched holes with a depression have the function of retaining a connecting element in relation to a wall element. The retaining function is to prevent the connecting element inserted onto an outer edge of a wall element from being able to fall off. The depression of a punched hole is provided on the control side of a connecting element, advantageously on the front side of a leg of a connecting element, so as to be able to accommodate the countersunk head of a pop rivet, while the other punched hole is needed for rearward attachment with the drift pin head. The protruding end of the rivet body is deformed by the drift pin head into a closing head. The materials lying in between, here the two legs of a U-shaped profile of a connecting element with the interspersed wall component, are pressed together, thereby creating a non-positive connection.

To this end, it is required that several punched holes located in the flat parts of the quadrants be provided with a depression, preferably in quadrants II and III. Alternatively, however, the punched holes in the flat parts of quadrants I and IV could also be provided with a depression. But it must be remembered that a connecting element has a front and rear side. The front side of a connecting element must be brought in line with the front side of a wall component during assembly. The depressions of the punched holes are thus to be provided on the front side of a connecting element. In order to make this possible, the flat parts must be folded over in pairs at the bending lines. After bent by approx. 90 degrees, the individual flat parts of quadrants I and II point in one direction as the pair of legs of a U-shaped profile. After also bent by 90 degrees, however, the flat parts of quadrants III and IV also in the other, opposite direction as the pair of legs of a U-shaped profile.

For this reason, the punched holes to be provided a depression must in a first arrangement be situated once on the front side, for example in the flat part of quadrant II, and once on the rear side, for example in the flat part of quadrant III, of a punched part. These two flat parts are located perpendicularly one above the other. The corresponding punched holes in the flat parts of quadrants I and IV have no depression, and these two flat parts are also located perpendicularly one above the other. Naturally, the depression in the punched holes can also take place in reverse based on the symmetrical properties of the connecting element. In reverse here means that the depression can also be arranged differently on the punched holes. In a second arrangement, the depression of the punched holes can also take place on the front side in the flat part of quadrant I and on the rear side of the flat part IV. The corresponding punched holes in the flat parts of quadrants II and III then have no depression. The depressions on the punched holes would then be arranged in the flat parts of quadrants I and IV, taking into account the front and rear sides. Regardless of which arrangement is selected for the depressions in the flat parts, a punched hole with a depression and a punched hole without a depression always oppose each other on a shared center line, perpendicularly in the legs of a U-shaped profile. The punched holes provided with a depression on the front side and with a depression on the rear side of a punched part have an elevation or a defined ridge on the respective opposite side of the depression in the flat part. A punched hole with a depression and a punched hole without a depression always form a punched hole pair, and are spaced apart by a web of the connecting element. The legs in which the punched holes are situated are spaced parallel apart from each other by a gap created by the web width.

Instead of embossing, the depressions can be designed in such a way in another manufacturing process that the punched holes provided with a depression on the front side and with a depression on the rear side of a punched part have a defined ridge on the respective opposite side of the punched hole. A defined ridge is understood as the embodiment and height of a ridge. Embodiments include small tooth systems, wherein the height of a ridge, and hence of the tooth system, can range between 0.5 mm and up to 2 mm. The job of the ridge with its tooth system is to prevent a connecting element from shifting on its own after inserted on a narrow longitudinal and/or transverse edge of a wall element. The task of the ridge is to generate more friction with the wall component via its tooth system, and thereby ensure a specific adhesion. Naturally, the craftsman can apply a slight force to shift the connecting element or remove it again, for example so as to be used once again at another location. The ridge imparts a hook-like resistance to two of the four interior surfaces of the legs or flanks, which prevents a connecting element from falling off a wall component, above all when the connecting elements are laterally inserted on perpendicular narrow sides of a wall component. If a connecting element is inserted with its first U-shaped profile on a first narrow side of a wall component, and a second wall component is pushed into the second U-shaped profile, it is advantageous for the connecting element to exert a certain counterforce against any shifting.

In summation, the following can be stated with regard to the aforementioned exemplary embodiment. Thanks to a creative design, the connecting element according to FIG. 1a in conjunction with FIG. 2a allows for a cost-effective manufacture and easy, ergonomic handling. The cost-effective and simple production process is achieved by virtue of giving a flat punched part punched holes at corresponding locations, preferably at four prescribed locations, and cutting into it at two prescribed lines, as well as chamfering it at two prescribed lines, thereby yielding a connecting element ready for installation. Such a connecting element can be inserted or slipped onto any location of the wall component desired, so as to significantly improve handling during the assembly of wall components. The two U-shaped profiles cause the wall components to be precisely aligned and held against each other. Because of the two U-shaped profiles, the wall components can no longer slide laterally when abutting each other. Easy to use pop rivets are utilized to establish a non-positive connection between a connecting element and at least two wall components.

In another aspect, the invention also relates to a corner angle connecting element according to FIG. 1a in conjunction with FIG. 2b. A corner angle is understood as an obtuse angle of between 90 degrees and 180 degrees between the U-profiles of a corner angle connecting element. The two U-profiles of a standard connecting element are spaced apart from each other by a straight angle of 180 degrees. As a result, the U-profiles of a standard connecting element face in the opposite direction, while the two U-profiles of a corner angle connecting element are always spaced apart from each other by an obtuse angle of less than 180 degrees. Each U-profile is here angled by an acute angle of less than 90 degrees relative to the shared web. A formed corner angle element consists of an integral, punched sheet metal part. It is shaped like a double-U. A U-profile consists of two legs spaced apart by a web. The U-profiles are offset in a perpendicular direction, and angled at an inclination opposite the shared web. Corner angle connecting elements are preferably used in roof extensions. This corner angle connecting element is another advantageous configuration of a standard connecting element. A corner angle connecting element makes it possible to significantly increase safety while laying or handling wall components. The corner angle connecting element is also an inventive connecting element for joining panel-shaped components for interior construction, e.g., for covering walls, ceilings and/or fabricating lightweight walls, above all for inclined walls and pointed arches. Such corner angle connecting elements are used during the assembly of such wall components, in particular for roof extensions, or anywhere the narrow sides of the wall components are not perpendicular, but rather abut against each other at a specific angle, just as in the case of roof pitches.

The roof pitch describes the steepness of a roof surface, which is indicated as an angle in degrees, the so-called roof pitch angle. The roof pitch angle is predominantly used for the classic gabled roof, and as a rule measures between 20 degrees and 80 degrees, preferably 45 degrees. In order to achieve a traversable room, a roof extension starts with wall components, as a rule with the assembly of perpendicular wall components. Owing to the roof incline or roof pitch, these wall components are then adjoined by wall components whose narrow sides abut against the narrow sides of the perpendicularly arranged wall components at a roof pitch angle. Corner angle connecting elements can be used to greatly simplify the assembly of wall components to be secured to the perpendicularly arranged wall components at an angle. The wall components arranged on the roof incline are then laid vertically, i.e., in the direction of the roof ridge, until a horizontal ceiling comprised of wall components is to be put in. In other words, an angle once again arises at the location where the narrow sides of the wall components arranged on the roof incline come to abut against the narrow sides of the horizontally arranged wall components. This angle between the roof incline and horizontal ceiling then corresponds with the angle between the perpendicular wall components and roof incline. Since these angles are identical, the same corner angle connecting angles can be used at both seams of the adjoining wall components. Because the roof inclines vary, corresponding corner angle connecting elements with different angles between the legs of the U-shaped profiles are kept available.

As described above, an inventive, flat punched part designed with a symmetrical contour according to FIG. 1a is used as the basis when manufacturing such corner angle connecting elements. In a normal embodiment of a connecting element comprised of two offset and opposing U-profiles, the U-profiles according to FIG. 2a are spaced apart by 180 degrees relative to each other and lie on a 180 degree plane. Each leg of a U-profile stands perpendicular to the web in this embodiment. By contrast, the opposing U-profiles in a corner angle connecting element are arranged at an angle of between 30 degrees and 180 degrees to each other according to FIG. 2b, 2c, so that they no longer lie in the same plane. However, if the foldable flat parts, meaning the legs of the U-shaped profiles, are bent to yield a shared, remaining flat part, the web, e.g., by 22.5 degrees out of the plane of 180 degrees, this results in an angle of 135 degrees between the two U-shaped profiles. All legs now no longer stand perpendicular to the web. However, folding over the flat parts to yield the remaining flat part, the shared web, does reduce the distance between the legs of a U-shaped profile. Due to a reduced distance between the legs, a specific wall thickness for a wall element can no longer be pressed between the legs of a profile. In order to eliminate this problem, it is proposed that the shared web be correspondingly expanded, so as to ensure a specific distance for the thickness of the wall elements after folding over the flat parts between the legs. In other words, given an exemplary angle of 135 degrees between the U-shaped profiles, the shared web has a specific width that is wider than the web width in the base punched part. The punched cuts in the flat punched part are no longer designed to be that long. This increases the distance between the punched cuts, so that the bending lines can also be shifted. This approach to shifting the bending lines spaced parallel apart away from each other automatically causes the web to expand. This means that the respective web width of the shared web can be adjusted given any change in the angle between the U-shaped profiles. Conversely, this means that widening the web makes it possible to set any angle between the U-profiles. The symmetrical base embodiment of a flat punched part according to FIG. 1a remains the starting element when manufacturing such a corner angle connecting element. The advantage to this is that an identical, symmetrical punched part according to FIG. 1a can always be used when manufacturing various embodiments of corner angle connecting elements with different angles between the U-profiles according to FIG. 2b.

In another inventive embodiment during the manufacture of corner angle connecting elements, a punched part according to FIG. 1b is used, and not a flat, symmetrical punched part according to FIG. 1a. As evident from FIG. 1b, the web width of the shared web is not expanded for a corner angle connecting element, but instead an asymmetrical, flat punched part is used as the base element for manufacturing a corner angle connecting element. Asymmetrical because one flat part of the four flat parts of the punched part is enlarged or elongated, for example the flat part of quadrant IV. In this embodiment of corner angle connecting elements, the foldable flat parts, quadrants I and II, which comprise a first U-profile, based on the embodiment according to FIG. 1a, are bent by 90 degrees to the web, while the other two flat parts of quadrants III and IV, which comprise the second U-profile, are bent or arranged at a specific angle φ to the first U-profile. The legs of the second U-profile can thus assume any angle φ to the first U-profile, without the web or web width having to be changed. In order for the distance between the legs of the second U-profile to remain the same in this embodiment as well, one of the elongated legs incorporates an additional bending line, around which the leg of the U-profile is bent. This additional bending line in the elongated flat part can in turn be shifted, so as to always ensure an identical distance between the legs of the second U-profile given different angles φ of the second U-profile to the first U-profile. An intermediate web arises in the elongated flat part between the first bending line and additional bending line. Conversely, this means that shifting the additional bending line in the elongated flat part leads to a widening or shortening of the intermediate web according to FIG. 1b. Given a widening of the intermediate web, the distance between the legs of the second U-profile increases, because widening the intermediate web increases the distance of the one leg to the web, and thus also to the other leg of the same U-profile. Changing the width of the intermediate web in the second U-profile makes it possible to adjust each angle between the first and second U-profile for a corner angle connecting element according to FIG. 2c. As a consequence, corner angle connecting elements can have an angle ϑ between the two U-profiles of 30 degrees to 180 degrees. Warehouses are advantageously stocked with corner angle connecting elements with specific ϑ angles, for example 90 degrees, 120 degrees, 135 degrees, etc. The asymmetrical embodiment of a flat punched part according to FIG. 1b remains the starting element when manufacturing such a corner angle connecting element. The advantage to this is that an identical, asymmetrical punched part according to FIG. 1b can always be used when manufacturing various embodiments of corner angle connecting elements according to FIG. 2c with different angles 4 between the U-profiles. A corner angle connecting element for connecting at least two wall components consists of an integral corner angle connecting element punched and molded out of a sheet metal part. A corner angle connecting element is shaped like a double-U. A double-U in turn consists of a respective two legs spaced apart by a web. The legs of a U-profile are arranged at a right angle ε to the web, while the legs of the other U-profile are arranged offset in a perpendicular direction and at an acute angle φ to the web, as a result of which the U-profiles extend at an obtuse angle in a direction facing away from each other. An intermediate web adjoins the shared web of the corner angle connecting element in the U-profile area of quadrants III-IV. In principle, the intermediate web elongates the flat part of quadrant IV, see in the punched part on FIG. 1b. Strictly speaking, the flat part of quadrant IV is spaced apart from the web by the inserted intermediate web. Because it is pushed between the web and flat part in quadrant IV, the intermediate web has two bending lines. One bending line relates to the shared bending line on the web, while the other bending line is arranged between the intermediate web and flat part of quadrant IV. The flat part of quadrant IV is bent at the second bending line until it is spaced parallel apart from the leg of the same U-profile. The flat part then forms a leg of the U-profile, which is at an acute angle φ to the intermediate web.

BRIEF DESCRIPTION OF THE DRAWINGS

Reference is now made more particularly to the drawings, which illustrate the best presently known mode of carrying out the invention and wherein similar reference characters indicate the same parts throughout the views.

FIG. 2a is a formed connecting element according to the invention with fastening openings arranged in a vertical direction, schematically illustrated according to FIG. 1a.

FIG. 2b is a formed corner angle connecting element according to the invention, schematically illustrated according to FIG. 1a.

DETAILED DESCRIPTION OF THE DRAWINGS

Figure 1A:
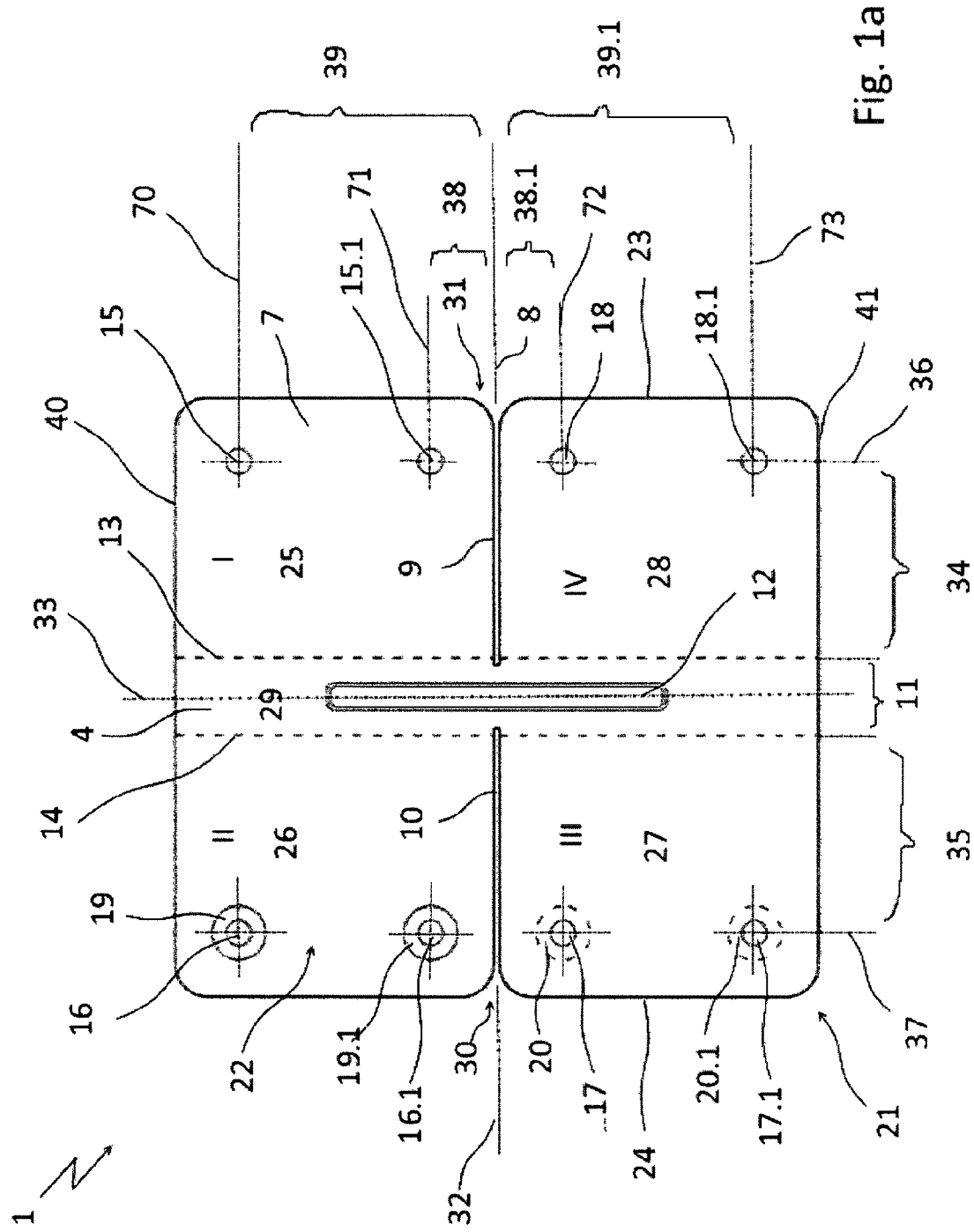
FIG. 1a is a flat, punched part according to the invention in an embodiment for a connecting element with fastening openings arranged in a vertical direction.

FIG. 1a shows a first specific exemplary embodiment of an integral sheet metal part fabricated out of a flat, final rolled product comprised of metal in a downstream punching process. This flat and integral sheet metal part is marked as punched part 7 below. In the subsequent bending process, chamfering the punched part 7 results in a connecting element 1, see FIG. 2a. As indicated in the above specification, the connecting element 1 according to the invention essentially consists of a flat, punched part 7, which is roughly square in shape, and rounded at the corners. In addition, two approximately V-cutouts 30, 31 or radii are formed with a square shape on the horizontal center line 32. Two punched sections 9, 10 are arranged on the horizontal center line 32, which start at the outer edge 23, 24 in the V-cutout 30, 31 and run in the direction of the center of the punched part 7. The two punched sections 9, 10 running on the same center line 32 are spaced apart from each other. The distance between the two punched sections 9, 10 forms a web width 11, which is characterized by bending lines 13, 14. A respective bending line 13, 14 is located at the end of the converging punched sections 9, 10. The two bending lines 13, 14 are arranged perpendicular to the two punched sections 9, 10 and parallel to the perpendicular center line 33. Four quadrants I-IV arise as flat parts 25, 26, 27, 28 between the punched sections 9, 10 and bending lines 13, 14. These flat parts 25, 26, 27, 28 are arranged as rectangular flat parts 25, 26, 27, 28 on the web 4, and spaced parallel apart from the center line 33. The longer side of the rectangular surface 25, 26, 27, 28 together with the bending line 13, 14 forms a shared edge, and is spaced parallel apart from the center line 33. The shorter side consists of the outer edge 40, 41 of the rectangular surface 25, 26, 27, 28, which comprise the length of the legs 5, 5.1, 6, 6.1 of the U-profiles 2, 3 and run perpendicular to the center line 33. Punched holes 15, 15.1, 16, 16.1, 17, 17.1, 18, 18.1 are arranged in these flat parts 25, 26, 27, 28, a respective two punched holes 15, 15.1, 16, 16.1, 17, 17.1, 18, 18.1 per flat part 25, 26, 27, 28. These punched holes 15, 15.1, 16, 16.1, 17, 17.1, 18, 18.1 are spaced parallel apart from the perpendicular center line 33 of the punched part 7. The parallel distance 34, 35 is formed by the two perpendicular center lines 36, 37, which run through a respective two flat parts 25, 28 and 26, 27 of quadrants II, II and I, IV. The punched holes 15, 15.1, 18, 18.1 arranged on the center line 36 correspond with the punched holes 16, 16.1, 17, 17.1 arranged on the center line 37. After the flat parts 25, 26 have been bent along the bending lines 13, 14, the punched holes 15, 15.1, 16, 16.1 are congruent, i.e., they now have a shared center line 48, see FIG. 2a and FIG. 3. The same also applies to the flat parts 27, 28 and their punched holes 17, 17.1, 18, 18.1, which also are congruent after bent around the bending lines 13, 14. The distance 38, 38.1 of the punched holes 15.1, 16.1, 17, 18 from the horizontal center line 32, and hence from the punched section 9, 10, measures roughly ⅕ of the overall length of a flat part 25, 26, 27, 28, while the distance 39, 39.1 of the punched holes 15, 16, 17.1, 18.1 from the horizontal center line 32 corresponds to roughly ⅘ of the overall length of a flat part 25, 26, 27, 28. The punched holes 15, 15.1, 18, 18.1 are arranged on the center line 36, and the punched holes 16, 16.1, 17, 17.1 are arranged on the center line 37 one over the other in a vertical direction.

A web 4 running from the outer edge 40 to the outer edge 41 arises between the two bending lines 13, 14, and forms a flat part 29. The web width 11 corresponds to the thickness of a wall component. This web 4 is arranged symmetrically around the center line 33, and is the shared web 4 of all four flat parts 25, 26, 27, 28, even though the flat parts 25, 26 are separated from the flat parts 27, 28 by a punched section 9, 10. In addition, the web 4 has a bead 12. The bead 12 corresponds to the shape of a channel-shaped recess 12. The channel-shaped recess 12 is arranged symmetrically to the perpendicular center line 33, and embossed on the front side 22 of the punched part 7. A corresponding elevation that conforms to the depression 12 forms on the rear side of the web 4. Therefore, the bead 12 progresses along the web 4, wherein the bead 12 has a length corresponding to roughly half the overall length of the punched part 7. As viewed from the horizontal center line 32, half the length of the bead 12 lies on the web section in quadrants I and II, while the other half of the bead 12 is arranged in the web section of quadrants III and IV. The connecting element 1 thus has a reinforced center web 4, from which four flat parts 25, 26, 27, 28 extend in opposite directions from each other.

The four flat parts 25, 26, 27, 28 together have eight stamped holes 15, 15.1, 16, 16.1, 17, 17.1, 18, 18.1, of which a respective two correspond with each other as a stamped hole pair. In other words, the stamped hole pair 15 and 16 and stamped hole pair 15.1 and 16.1 correspond with each other, and are hence congruent. The same holds true with respect to the stamped hole pairs 17 and 18 and stamped hole pairs 17.1 and 18.1. A respective stamped hole 16, 16.1, 17, 17.1 of a stamped hole pair 15, 16 and 15.1, 16.1 and 17, 18 and 17.1, 18.1 is advantageously provided with a depression 19, 19.1, 20, 20.1. The depression 20, 20.1 on the two stamped hole pairs 17, 17.1 is introduced on the rear side 21 of the flat part 27 of the stamped part 7, while the depression 19, 19.1 on the two stamped hole pairs 16, 16.1 is introduced on the front side 22 of the flat part 26 of the stamped part 7. The stamped holes 15, 16 are arranged on a center line 70, the stamped holes 15.1, 16.1 are arranged on a center line 71, the stamped holes 17, 18 are arranged on a center line 72, and the stamped holes 17.1, 18.1 are arranged on a center line 73, wherein the center lines 70, 71, 72, 73 are spaced parallel apart from the center line 32 and from the outer edge 40, 41, and are spaced a distance 38, 38.1, 39, 39.1 apart from the center line 32. This stamped part forms the basis for the connecting element 1 according to FIG. 2a. When manufacturing the connecting element 1 according to FIG. 2a, the four flat parts 25, 26, 27, 28 are all bent by the same angle ε 67 relative to the web 4, preferably by 90 degrees, into a U-profile 2, 3, so that the parallel distance between the legs 5, 5.1 and 6, 6.1 remains identical. A right bending angle ε 67 ensures that all legs 5, 5.1 and 6, 6.1 stand perpendicular to the shared web 4.

Figure 1B:
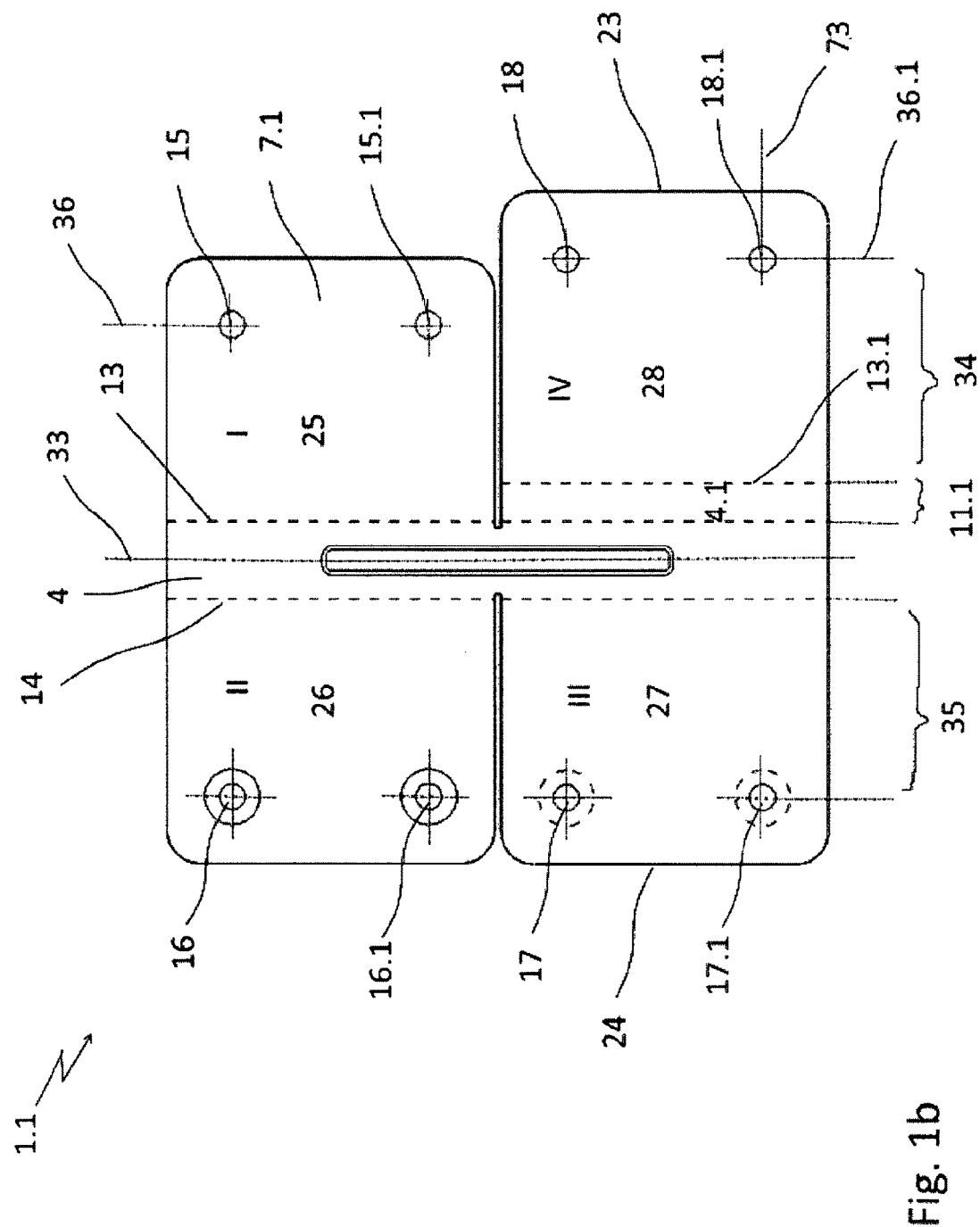
FIG. 1b is another exemplary embodiment according to the invention of a flat, punched part for a corner angle connecting element.
Figure 2A:
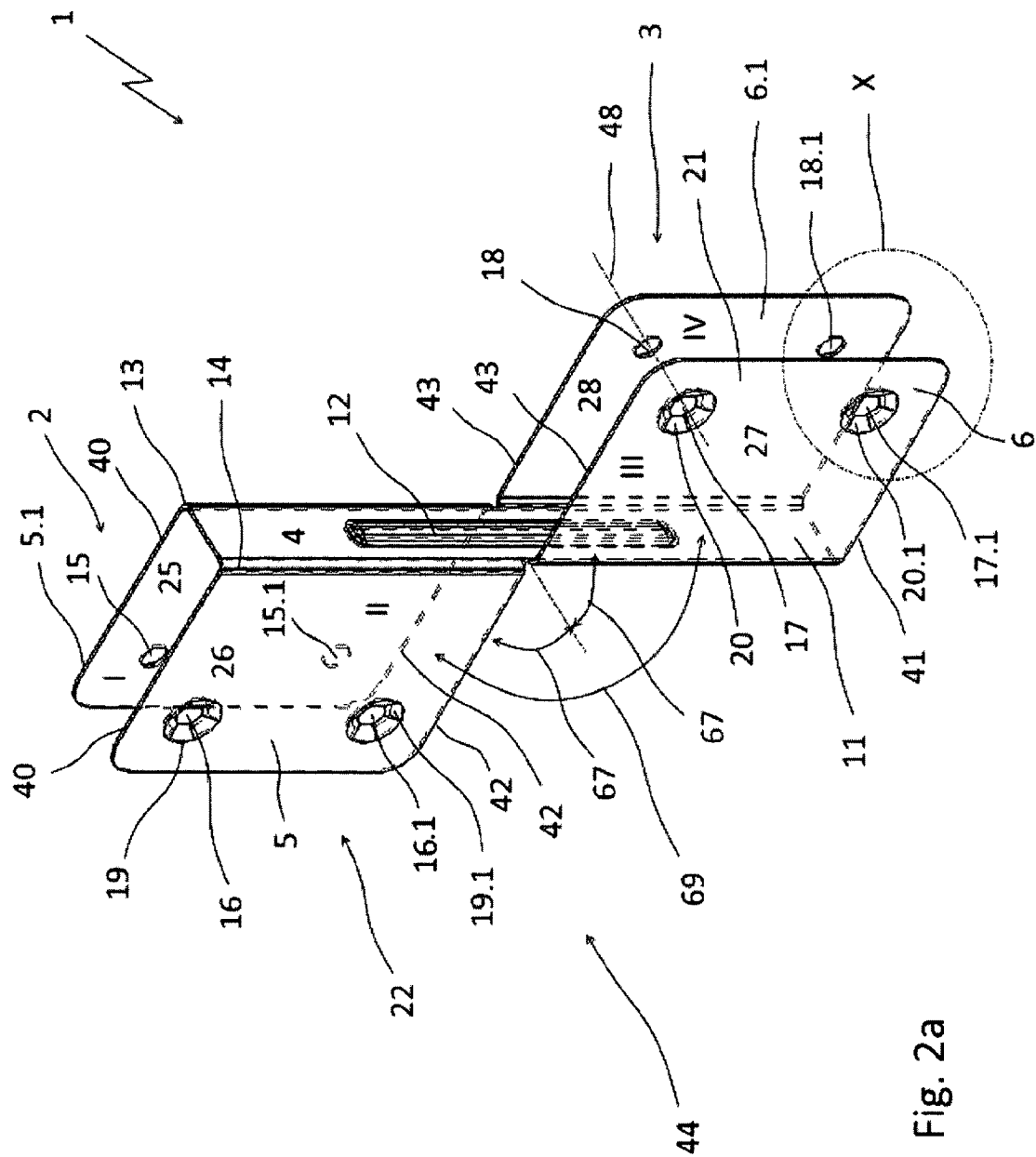
Figure 2B:
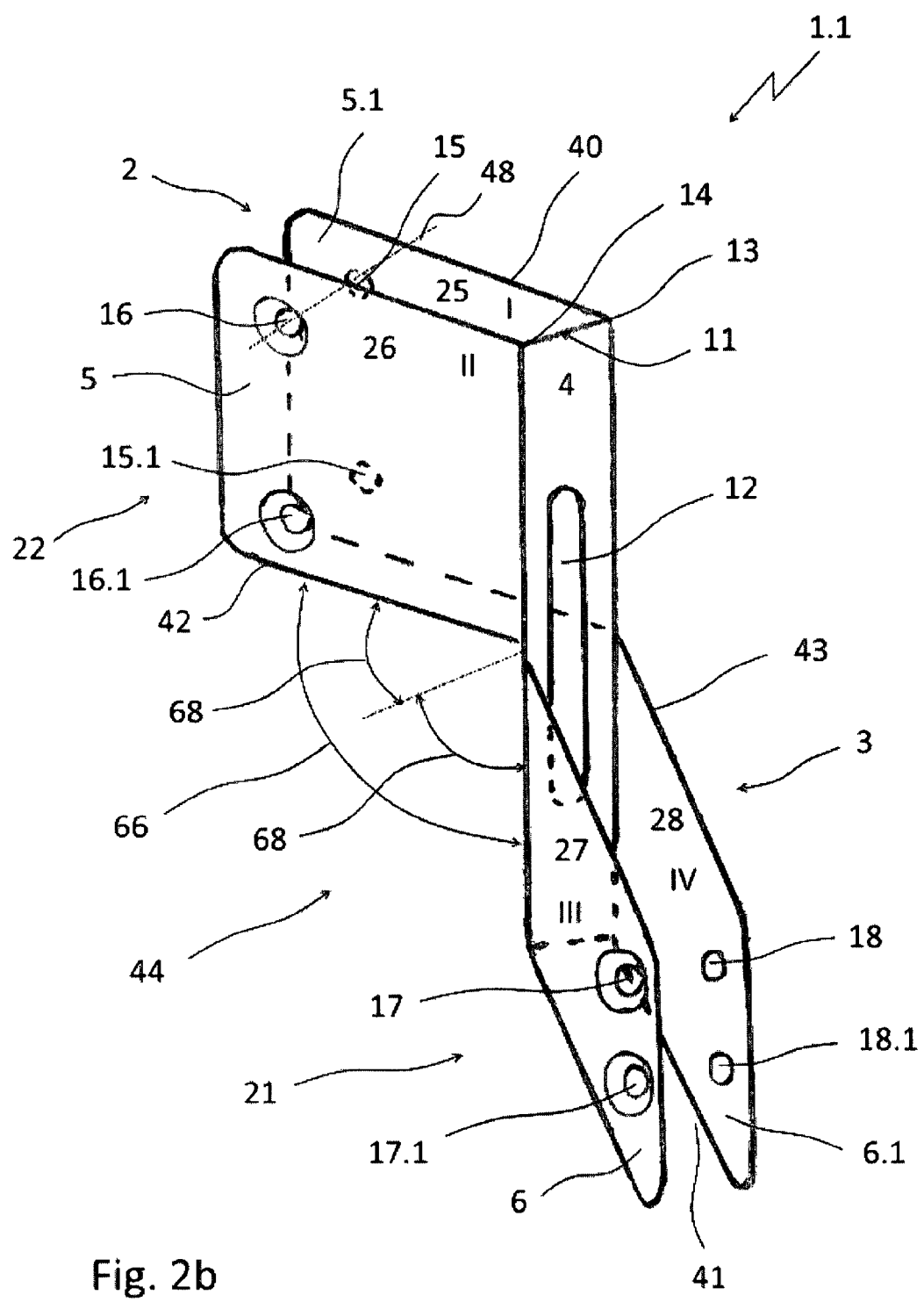

In addition, the punched part 7 forms the basis for a corner angle connecting element 1.1 according to FIG. 2b. When manufacturing a corner angle connecting element 1.1 according to FIG. 2b, all flat parts 25, 26, 27, 28 are bent by the same angle φ 68, not by a right bending angle ε 67 of 90 degrees, but instead only by an exemplary respective bending angle φ 68 of 67.5 degrees, resulting in an overall angle ϑ 66 of 135 degrees as the distance between the U-profiles 2, 3. The legs 5, 5.1 and 6, 6.1 are in turn spaced parallel apart, but no longer stand perpendicular to the shared web 4, but rather are arranged at an inclination to the latter. This changes the parallel distance between the legs 5, 5.1 and 6, 6.1, with the distance diminishing. The reduction in distance can be countered by expanding the web 4, which makes it possible to restore the required parallel distance between the legs 5, 5.1 and 6, 6.1, as shown on FIG. 2b. Identical designations on FIG. 1a are provided with the same reference numbers on FIGS. 1b, 2a, 2b, 2c, 3, 4a and 4b.

FIG. 1b schematically illustrates another specific exemplary embodiment of a flat punched part 7.1 for a corner angle connecting element 1.2. This second exemplary embodiment involves a workpiece comprised of a flat punched part 7.1, which is used in bending technology for manufacturing a corner angle connecting element 1.1. This punched part 7 forms the basis for the corner angle connecting element 1.2 according to FIG. 2*b*. The punched part 7.1 has three identical flat parts 25, 26, 27 with the accompanying quadrants I, II, III, as already known from FIG. 1*a*. For this reason, the description from FIG. 1*a* can here be drawn upon for describing FIG. 1*b*. These three flat parts 25, 26, 27 are provided with the corresponding punched holes 15, 15.1, 16, 16.1, 17, 17.1, and according to the first exemplary embodiment remain symmetrically arranged around the perpendicular center line 33. The difference between the punched part 7 used to fabricate the connecting element 1 and the punched part 7.1 used to fabricate the corner angle connecting element 1.1 is that the flat part 28 of quadrant IV has a different size. The change in size of the flat part 28 is equal to the change in size of the distance between the outer edge 23 and center line 33. Because of this differing size, the punched part 7.1 is asymmetrical in design. However, the asymmetry relates only to the difference between the flat part 27 and flat part 28 of quadrants III and IV, which remain arranged around the same center line 33, perpendicular thereto. With respect to the punched part 7, the length of the flat part 27 from the center line 33 up to the outer edge 24 is identical to the length of the flat part 28, which also runs from the center line 33 up to the outer edge 23. However, what is crucial is the distance 35 between the punched holes 17, 17.1 in quadrant III and the bending line 14 and the corresponding distance 34 between the punched holes 18, 18.1 in quadrant IV and the bending line 13.1. These two distances 34, 35 must be identical.

Figure 2C:
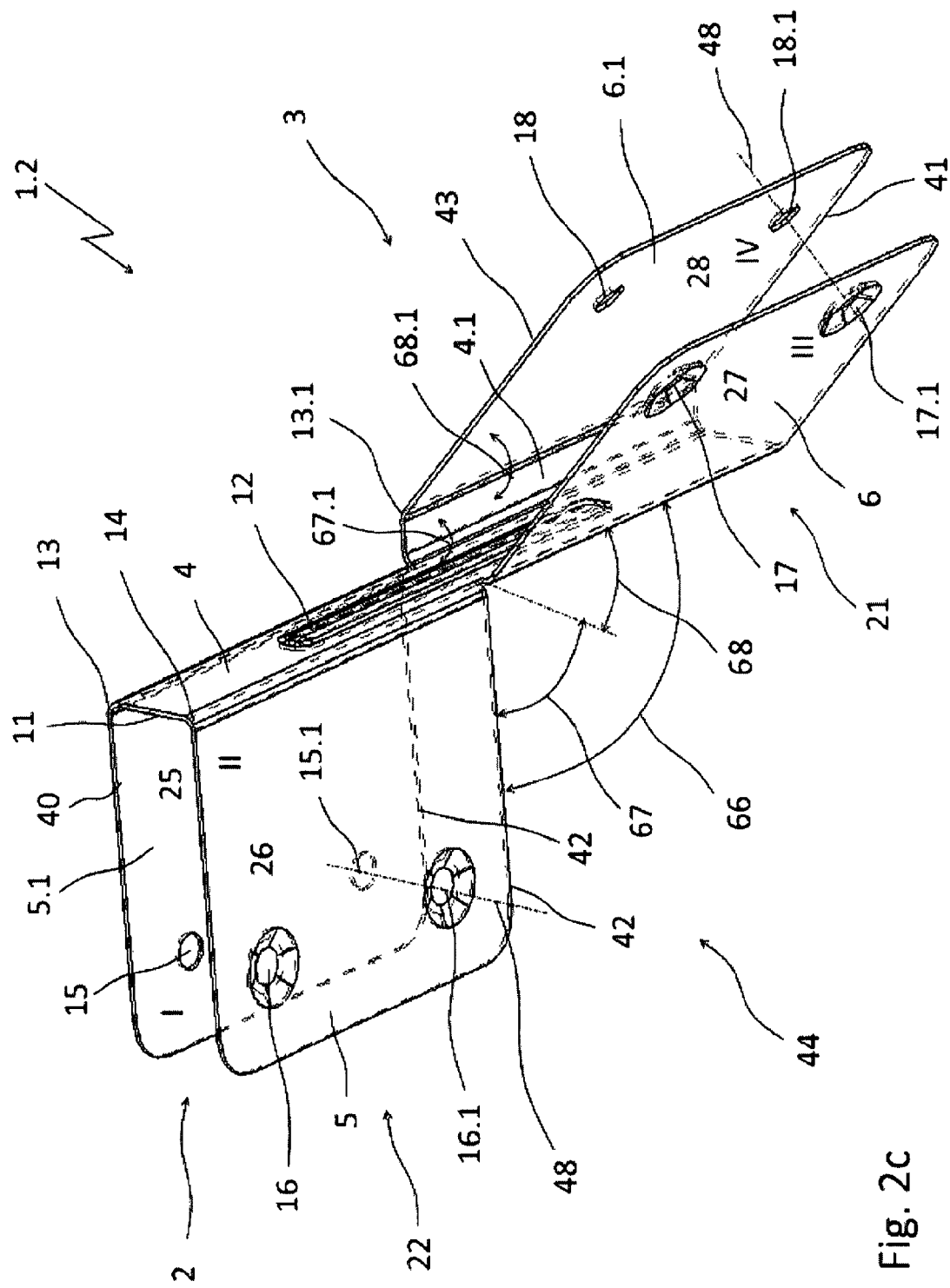
FIG. 2c is a formed corner angle connecting element according to the invention, schematically illustrated according to FIG. 1b.

When manufacturing the corner angle connecting element 1.2 according to FIG. 2*c*, only the flat parts 25, 26 are bent by the same angle ε 67, preferably by 90 degrees, to yield a U-profile 2, while the flat parts 27, 28 are not bent by 90 degrees, but rather only by the angle φ 68, for example by 45 degrees, relative to the web 4 to yield a U-profile 3. This results in an overall angle ϑ 66 of 135 degrees between the two U-profiles 2, 3. The legs 5, 5.1 of the U-profile 2 stand perpendicular to the web 67 due to the right angle ε 67, while the legs 6, 6.1 are arranged at an inclination to the web 4 due to the other bending angle φ 68. However, the parallel distance between the legs 6, 6.1 of the U-profile 3 would diminish here as well. In order to offset this reduction, the invention proposes that the flat part 28 be elongated for the punched part 7.1. The elongation yields an intermediate web 4.1. The intermediate web 4.1 is hinged to the web 4 on the one hand, and to the leg 6.1 of the U-profile 3 on the other. The intermediate web 4.1 is bounded by the bending line 13 and bending line 13.1. The width 11.1 of the intermediate web 4.1 counteracts the reduction in the parallel distance between the legs 6, 6.1 in the bending process. The change in the parallel distance between the legs 6, 6.1 is influenced by the bending angle ϑ 66, see FIG. 2*c*, wherein the bending angle ϑ 66 indicates the distance between the U-profile 2 and U-profile 3. The angle ϑ 66 is an obtuse angle, which in turn is comprised of the two angles ε 67 and φ 68. The angle ε 67 forms the right angle between the web 4 and legs 5, 5.1 of the U-profile 2, while the angle φ 68 forms the acute angle between the web 4 and legs 6, 6.1 of the U-profile 3. The more acute the angle φ 68 gets, the wider the intermediate web 4.1 must become to continue ensuring the same required parallel distance between the legs 6, 6.1. The required distance between the legs 6, 6.1 of a U-profile 3 is determined by the wall thickness of a wall element 47. Even if the width of the intermediate web 11.1 increases, the clearance 34 between the bending line 13.1 and center line 36.1 that runs through the punched holes 18, 18.1 is held constant. This ensures that the punched holes 18, 18.1 correspond with the punched holes 17, 17.1 after the process of bending the flat parts 27, 28, and have a shared center line 73.

Figure 1C:
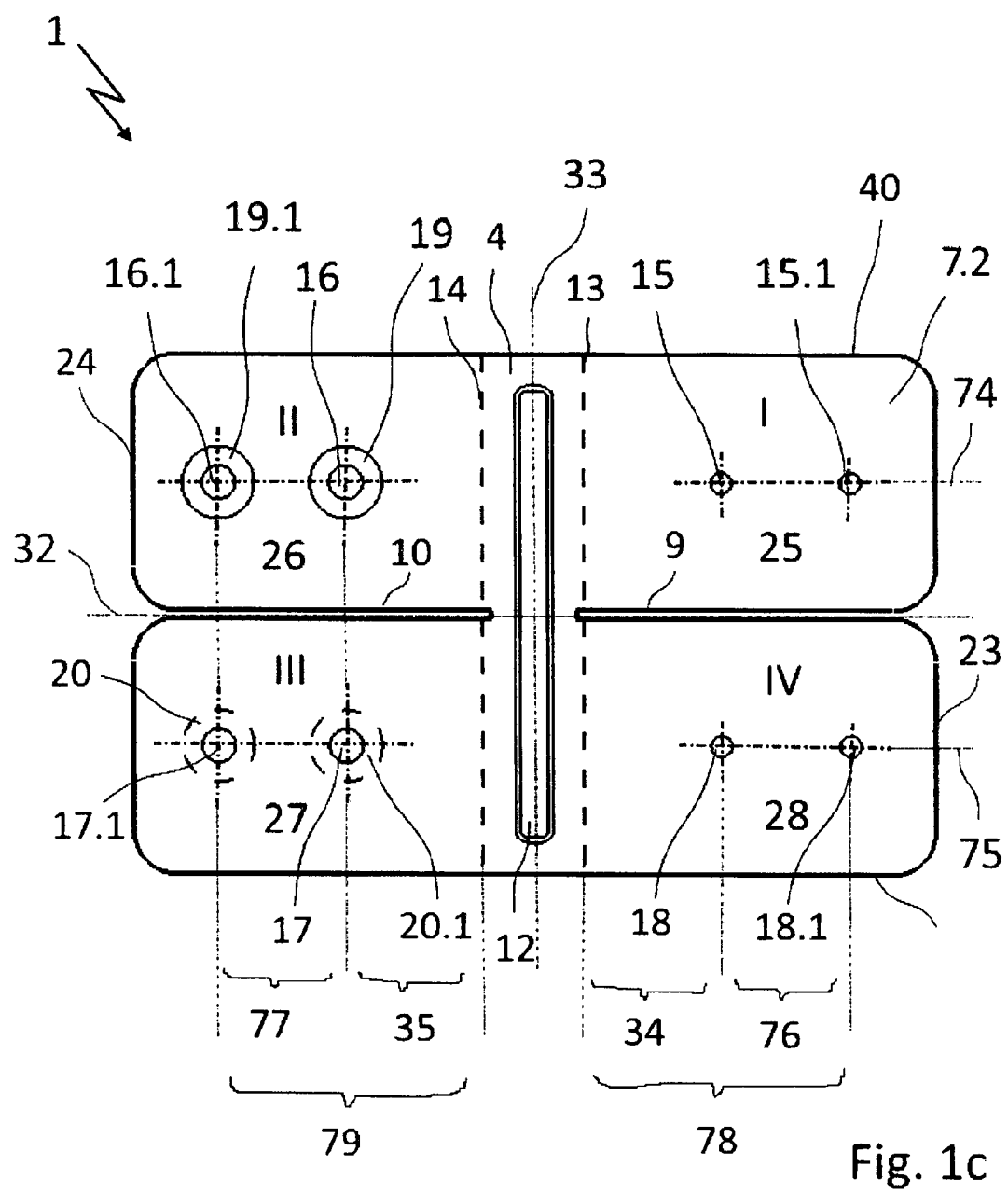
FIG. 1c is a flat punched part according to the invention in an embodiment for a connecting element with fastening openings arranged in a horizontal direction.

FIG. 1*c* shows another specific exemplary embodiment of a flat punched part 7.2 proceeding from FIG. 1*a*. In the ensuing bending process, the punched part 7.2 also yields a connecting element 1 according to FIG. 2*d*. A portion of the description for the flat punched part 7.2 can be derived from FIG. 1*a*. Corresponding reference numbers are analogously incorporated into FIG. 1*c* here as well. In other words, the web 4 and channel-shaped recess 12 arranged on the perpendicular center line 33 along with the two punched sections 9, 10 on the horizontal center line 32 are identical to the punched part 7 on FIG. 1*a*. Only the differences to FIG. 1*a* are here highlighted. This punched part 7.2 forms the basis for a connecting element 1 according to FIG. 2*d*. The punched part 7.2 has four identical flat parts 25, 26, 27, 28 with the accompanying quadrants I, II, II, IV, as already known from FIG. 1*a*. These flat parts 25, 26, 27, 28 are also bounded by the outer edges 23, 24, 40, 41, wherein the length of the outer edges 23, 24, 40, 41 determines the size of the flat parts 25, 26, 27, 28. In the punched part 7 in the exemplary embodiment according to FIG. 1*a*, the lengths of the outer edges 23, 24, 40, 41 are dimensioned in such a way as to yield roughly a square for the punched part 7. The lengths of the outer edges 40 to 24 or 41 to 23 have a ratio of roughly 1:1 to each other. The punched sections 9, 10 form four flat parts 25, 26, 27, 28 for the square, which form a rectangle, wherein the interior longitudinal sides of the rectangular flat parts 25, 26, 27, 28 correspond with the bending lines 13, 14, and the short outer edges 40, 41 (short longitudinal sides of the rectangular flat parts 25, 26, 27, 28) determine the length of a leg 5, 5.1, 6, 6.1. Short outer edges 40, 41 yield short legs 5, 5.1, 6, 6.1 for a connecting element 1, in which the fastening openings (punched holes 15, 15.1, 18, 18.1, 16, 16.1, 17, 17.1) are vertically arranged. In the present exemplary embodiment of the punched part 7.2, the lengths of the outer edges 40, 41 are dimensioned in such a way as to yield a rectangle for the punched part 7.2. The lengths of the outer edges 40 to 24 or 41 to 23 have a ratio of roughly 1.6:1 to each other. In other words, the outer edge 40, 41 is significantly longer in design than the outer edge 23, 24. This rectangle is again divided into four flat parts 25, 26, 28, which in turn each form a rectangle, wherein the short longitudinal sides of the rectangular flat parts 25, 26, 27, 28 now correspond with the bending lines 13, 14, and the longer outer edges 40, 41 arranged perpendicular to the center line 33 form long legs 5, 5.1, 6, 6.1 for a connecting element 1, in which the fastening openings (punched holes 15, 15.1, 16, 16.1 and punched holes 17, 17.1, 18, 18.1) are arranged horizontally on a center line 74, 75. The number of punched holes in quadrants I, II, III, IV of the punched part 7.2 is identical with the embodiment of the punched part 7, with only the arrangement having been changed to satisfy the requirements during assembly in the building trade. The distance 34, 35 between the punched holes 15, 18 and 16, 17 in punched part 7.2 and the bending line 13, 14 is approximately the same as the distance 34, 35, between the punched holes 15, 15.1, 18, 18.1 and 16, 16.1, 17, 17.1 in punched part 7 according to FIG. 1*a*, wherein the distance 78, 79 between the punched holes 15.1, 18.1 and 16.1, 17.1 and the bending line 13, 14 is significantly greater, and produced by the distance 34, 35 from the bending line 13, 14 and the distance 76, 77 between the punched holes 15, 15.1 and 16, 16.1 as well as 17, 17.1 and 18, 18.1.

Based on the punched part 7 according to FIG. 1*a*, FIG. 2*a* schematically illustrates a connecting element 1 according to the invention after the bending process. For this reason, the reference numbers listed on FIG. 1*a* are here used analogously. The two flat parts 25, 26 of quadrants I, II are bent toward the back along the bending lines 13, 14 by a respective 90 degrees and form the legs 5, 5.1 of the U-shaped profile 2, wherein the legs 5, 5.1 largely run parallel to each other. The web 4 with its channel-shaped recess 12 remains in its position, thereby yielding a U-shaped profile 2. The two punched hole pairs 15, 16 and 15.1, 16.1 stand perpendicular to each other, spaced apart only by the web width 11, and now have a shared center line 48. The two punched lines 9, 10 according to FIG. 1*a* now form an outer edge 42, spaced parallel apart from the outer edge 40. Analogously thereto, the two flat parts 27, 28 of quadrants III, IV were also bent toward the front along the bending lines 13, 14 by 90 degrees, and now form the legs 6, 6.1 of the U-shaped profile 3. These legs 6, 6.1 also run largely parallel to each other. The legs 6, 6.1 of the U-shaped profile 3 run in the direction opposite the offset, opposing legs 5, 5.1 of the U-profile 2. This means that the U-shaped profile 2 bent toward the back is spaced apart from the U-shaped profile 3 bent toward the front by 180 degrees. The openings of the U-profiles 2, 3 thus face in the opposite direction. The two punched hole pairs 17, 18 and 17.1, 18.1 now also stand perpendicular to each other, spaced apart only by the web width 11, and have a shared center line 48. Here as well, the two punched lines 9, 10 according to FIG. 1*a* form an outer edge 43, and run spaced parallel apart to the outer edge 41. The front side 22 of the flat part 26 of quadrant II together with the rear side 21 of the flat part 27 now form a shared front surface 44, which corresponds to the control side of the connecting element 1. The shared front surface 44 of the control side is reached via the used bending angle ε 67. All flat parts 25, 26, 27, 28 are bent by the same angle ε 67, preferably by 90 degrees, to yield a U-profile 2, 3, as a result of which the legs 5, 5.1, 6, 6.1 form U-shaped profiles 2, 3. A right bending angle ε 67 ensures that all legs 5, 5.1 and 6, 6.1 stand perpendicular to the shared web 4. An elongated angle θ 69 arises between the two U-shaped profiles 2, 3, and consists of the two right angles ε 67, so that the shared front surface 44 of the control side lies in one plane. Depressions 19, 19.1, 20, 20.1 are introduced into the punched holes 16, 16.1, 17, 17.1 on the control side of a connecting element 1 in order to introduce pop rivets 45. A punched hole pair 17.1, 18.1 as a cutout X from FIG. 2*a* is shown in greater detail on FIG. 3.

Figure 3:
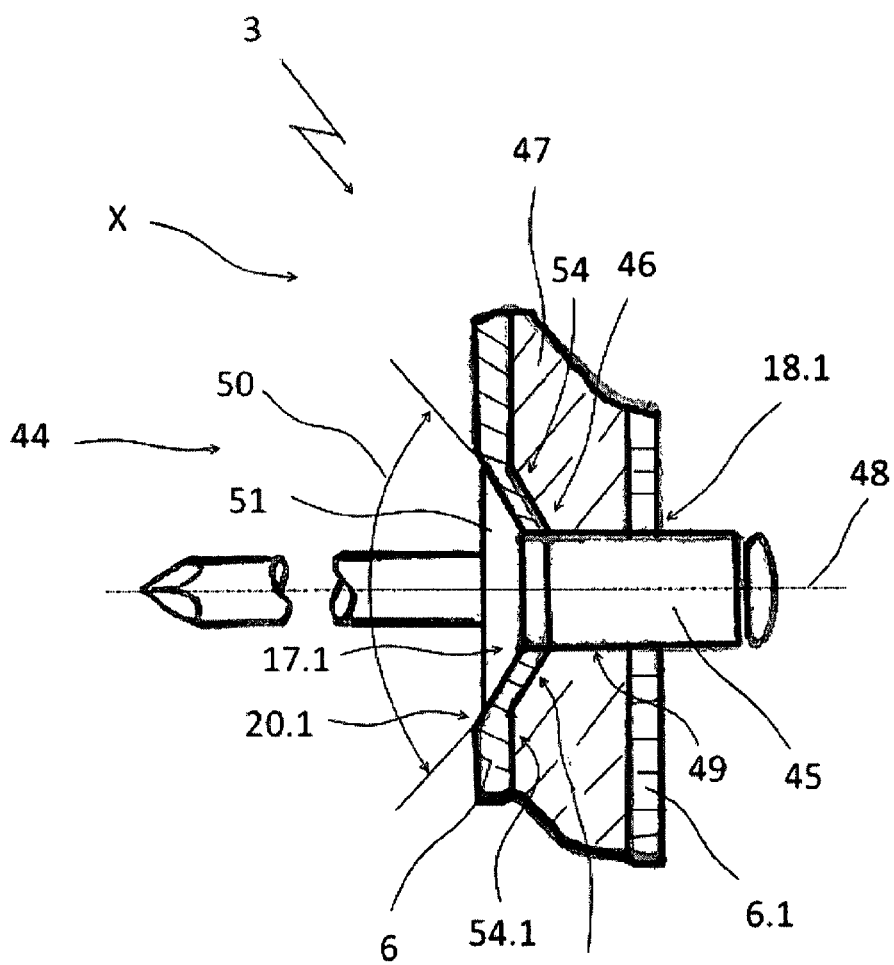
FIG. 3 is a cross section of an embodiment of a punches hole in the connecting element.

Based on the punched part 7 according to FIG. 1*a*, FIG. 2*b* presents a schematic illustration of a corner angle connecting element 1.1 according to the invention after the bending process. The reference numbers listed on FIG. 1*a* are here analogously used. The two flat parts 25, 26 of quadrants I, II are bent toward the back by a respective 67.5 degrees along the bending lines 13, 14, and form the legs 5, 5.1 of the U-shaped profile 2, wherein the legs 5, 5.1 run largely parallel to each other. The web 4 with its channel-shaped recess 12 remains in its position, thereby yielding an approximately U-shaped profile 2. The two punched hole pairs 15, 16 and 15.1, 16.1 now stand perpendicular to each other, and are only spaced apart by the web width 11. The two punched lines 9, 10 according to FIG. 1*a* now form an outer edge 42, and run spaced parallel apart from the outer edge 40. Analogously thereto, the two flat parts 27, 28 of quadrants III, IV were bent toward the front by 67.5 degrees, also along the bending lines, and now form the legs 6, 6.1 of the U-shaped profile 3. These legs 6, 6.1 also run largely parallel to each other. As opposed to the flat parts 25, 26 of quadrants I, II or to the legs 5, 5.1, however, the legs 6, 6.1 of the U-shaped profile 3 face in roughly the opposite direction. A U-shaped profile 3 is formed here as well, and faces in approximately the opposite direction, angled by 135 degrees to the U-shaped profile 2. The web 4 with its depression 12 remains in its position between the legs 5, 5.1, 6, 6.1. However, all legs 5, 5.1, 6, 6.1 are arranged inclined to the web 4, since they were chamfered not at an angle ε 67 of 90 degrees, but at an angle φ 68 of 67.5 degrees. The two punched hole pairs 17, 18 and 17.1, 18.1 now also stand perpendicular to each other, spaced apart only by the web width 11. Here as well, the two punched lines 9, 10 according to FIG. 1*a* now form an outer edge 43, and run spaced parallel apart from the outer edge 41. The front side 22 of the flat part 26 of quadrant II now forms a shared front side 44 with the rear side 21 of the flat part 27. The shared front side 44 corresponds to the control side of the connecting element 1.1. The shared front side 44 of the control side is achieved by the used bending angles φ 68. All flat parts 25, 26, 27, 28 are bent by the same angle φ 68, preferably by 67.5 degrees, to yield a U-profile 2, 3, as a result of which the legs 5, 5.1, 6, 6.1 form U-shaped profiles 2, 3. An acute bending angle φ 68 ensures that all legs 5, 5.1 and 6, 6.1 run at an inclination to the shared web 4. An obtuse angle ϑ 66 arises on the front side 22 between the two U-shaped profiles 2, 3, and is comprised of the two acute angles φ 68. The shared control side of the legs 5, 6 remains, although the U-profiles 2, 3 are angled relative to each other, still on the front side 44 of a corner angle connecting element 1.1. In addition, depressions 19, 19.1, 20, 20.1 for introducing pop rivets 45 according to the following FIG. 3 are provided in the punched holes 16, 16.1, 17, 17.1 on the control side of a corner angle connecting element 1.1.

Based on the punched part 7.1 according to FIG. 1*b*, FIG. 2*c* presents a schematic illustration of a corner angle connecting element 1.2 according to the invention after the bending process. The reference numbers listed on FIG. 1*b* are here analogously used. The two flat parts 25, 26 of quadrants I, II are bent toward the back by a respective 90 degrees along the bending lines 13, 14, and form the legs 5, 5.1 of the U-shaped profile 2, wherein the legs 5, 5.1 run largely parallel to each other. The web 4 with its channel-shaped recess 12 remains in its position, thereby yielding a U-shaped profile 2. The two punched hole pairs 15, 16 and 15.1, 16.1 now stand perpendicular to each other, spaced apart only by the web width 11, and now have a shared center line 48. The two punched lines 9, 10 according to FIG. 1*b* now form an outer edge 42, and run spaced parallel apart from the outer edge 40. Analogously thereto, the flat part 27 of quadrant III was bent toward the front, but only by 45 degrees, also along the bending lines, and now forms the legs 6 of a U-shaped profile 3. Contrary to the indications on FIG. 2*a*, the flat part 28 is not bent around the bending line 13 to a leg 6.1 to obtain a U-profile, but now the intermediate web 4.1 instead. The intermediate web 4.1 laterally adjoins the web 4 directly, and is bent toward the front by 90 degrees at the bending line 13. As was the case with the leg 6.1 from FIG. 2*a*, the intermediate web 4.1 is bent toward the front by 90 degrees, and thus stands perpendicular to the web 4. The flat part 28, which is identical to the other flat parts 28 from FIGS. 1*a*, 2*a*, 2*b*, is now bent toward the front by 45 degrees at the bending line 13.1, just as the flat part 27. The angled flat part 28 now forms the leg 6.1. As a consequence, the legs 6 and 6.1 run in the same direction, and are largely spaced parallel apart from each other, wherein both legs 6, 6.1 now form a U-shaped profile 3. The web 4 with its channel-like depression 12 remains unchanged in its position between the legs 5, 5.1, 6, 6.1.

The legs 5, 5.1 of quadrants I, II stand perpendicular to the web 4, while the legs 6, 6.1 of quadrants III, IV face in a direction angled away from the web 4. In other words, the U-profile 2 is perpendicular to the web 4, and the U-profile 3 is arranged at a specific angle to the web 4. The two offset and opposing U-profiles 2, 3 face roughly in the opposite direction. A U-shaped profile is formed here as well, which faces in approximately the opposite direction at an angle ϑ 66 of 135 degrees to the U-shaped profile 2. The two punched hole pairs 17, 18 and 17.1, 18.1 now also stand perpendicular to each other, spaced apart only by the web width 11. The two punched lines 9, 10 from FIG. 1*b* now form an outer edge 43, and run spaced parallel apart from the outer edge 41. The front side 22 of the flat part 26 of quadrant II now forms a shared front side 44 with the rear side 21 of the flat part 27 of quadrant III. The front side 44 corresponds to the control side of the connecting element 1.2. The shared front side 44 of the control side is achieved by the used bending angles ε 67 and φ 68. The two flat parts 25, 26 are bent at the right angle ε 67, and the two flat parts 27, 28 are bent at an acute angle φ 68 of preferably 45 degrees to yield a U-profile 2, 3, as a result of which the 5, 5.1, 6, 6.1 form U-shaped profiles 2, 3. A right bending angle ε 67 between the legs 5, 5.1 and web 4 ensures that the legs 5, 5.1 are arranged perpendicular to the web 4, while an acute bending angle φ 68 between the leg 6 and web 4 ensures that the leg 6 runs at an inclination to the shared web 4. The acute bending angle φ 68.1 between the leg 6.1 and intermediate web 4.1 ensures that the leg 6.1 runs parallel to the leg 6. The bending angle ε 67 and bending angle φ 68 are congruent to the bending angles c 67.1 and φ 68.1.

An obtuse angle ϑ 66 comprised of a right angle ε 67 and an acute angle φ 68 arises between the two U-shaped profiles 2, 3 on the front side 44. The shared control side of the legs 5, 6 remains, although the U-profiles 2, 3 are angled relative to each other, still on the front side 44 of a corner angle connecting element 1.2. Depressions 19, 19.1, 20, 20.1 for introducing pop rivets 45 according to the following FIG. 3 are provided in the punched holes 16, 16.1, 17, 17.1 on the control side of a corner angle connecting element 1.2.

Figure 2D:
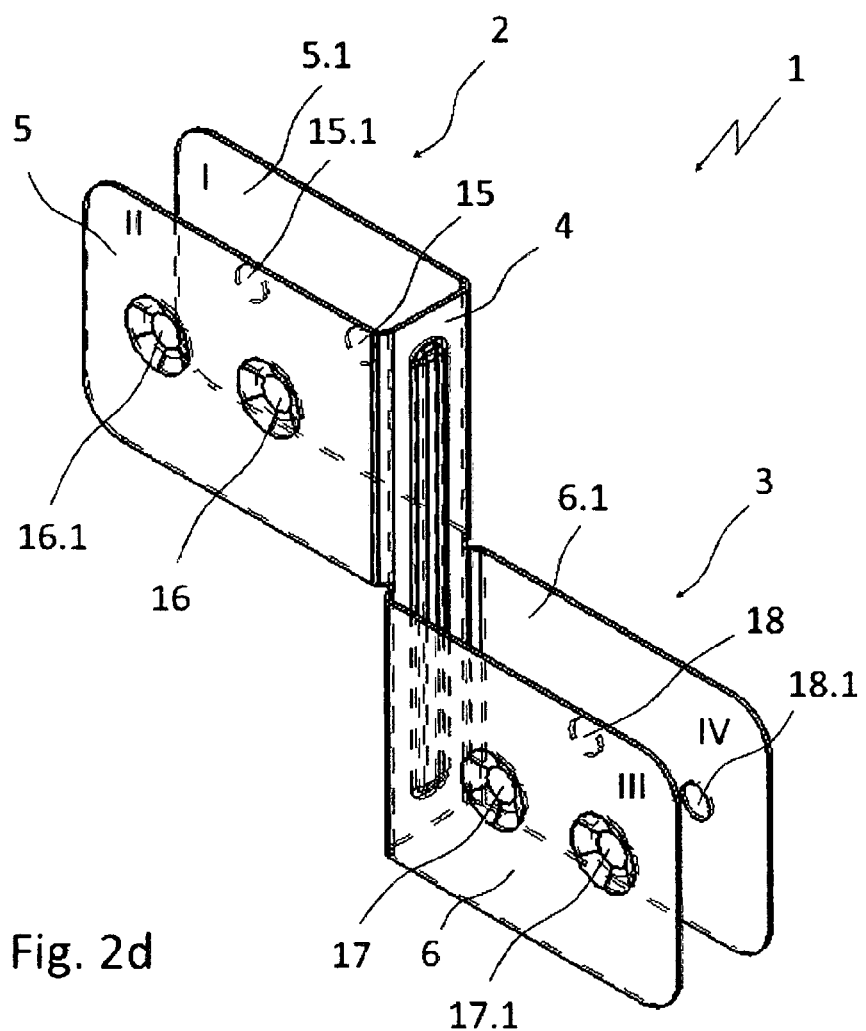
FIG. 2d is a formed connecting element according to the invention with fastening openings arranged in a horizontal direction, schematically illustrated according to FIG. 1c.

Based on the punched part 7.1 according to FIG. 1*c*, FIG. 2*d* presents a schematic illustration of a connecting element 1 according to the invention after the bending process. The reference numbers listed on FIG. 1*c* are here analogously used because the technical features are identical. Only the changes relating to the connecting element 1 from FIG. 2*a* are pointed out here. The connecting element 1 from FIG. 2*a* has short legs 5, 5.1, 6, 6.1 for the U-profiles 2, 3. The fastening holes (punched holes 15, 15.1, 18, 18.1, 16, 16.1, 17, 17.1) are vertically arranged on the center lines 36, 37, which are spaced parallel apart from the center line 33. By contrast, the connecting element 1 according to this FIG. 2*d* has long legs 5, 5.1, 6, 6.1 for the U-profiles 2, 3. In the long legs 5, 5.1, 6, 6.1 of the U-profiles 2, 3, the fastening holes (punched holes 15, 15.1, 16, 16.1 and 17, 17.1, 18, 18.1) are arranged next to each other and horizontally to the perpendicular center line 33 and to the web 4. The number of fastening holes in a leg 5, 5.1, 6, 6.1 in a horizontal direction depends on the length of the legs 5, 5.1, 6, 6.1, and can thus be adjusted to the requirements. The same holds true for the connecting element 1 according to FIG. 2*a*. The number of fastening holes are here arranged one over the other and vertically to the perpendicular center line 33 and to the web 4. The number of fastening holes depends on the length of the legs 5, 5.1, 6, 6.1 in a vertical direction, with an adjustment to the requirements during assembly being possible here as well.

FIG. 3 shows a connecting element 1 in cross section. Involved here is the cutout X from FIG. 2*a*. The reference numbers listed on FIGS. 1*a* and 2*a* are here used analogously. The cutout X indicates an embodiment for a punched hole pair 17.1, 18.1 in the connecting element 1, which is representative for the other punched hole pairs 15, 16 and 15.1, 16.1 and 17, 18 according to FIGS. 1*a*, 1*b*, 2*a*, 2*b*, 2*c*. FIG. 3 further shows the U-shaped profile 3, with a wall component 47 inserted between its flat parts 27, 28 for fastening a connecting element 1 to the latter, or the connecting element 1 is slipped onto a wall component 47. The depression 20.1 arranged in the flat part 27 or in the leg 6 around the punched hole 17.1 is located on the front side 44 of the connecting element 1. The depression 20.1 has an angle 50 that corresponds to the angle of the pop rivet head 51. The punched hole 18.1 spaced apart by the thickness of the wall component 47 is located in the flat part 28 on the same center line 48 of the punched hole 17.1 with the depression 20.1. The wall component 47 also has a borehole 49, wherein the size of the borehole 49 is adjusted to the diameter of the pop rivet 45.

In a first embodiment, the punched hole 17.1 has not only a depression 20.1 on the front side 44, but also a defined inclination 54 on the interior side 54.1 of the leg 6 created by embossing the depression 20.1. The inclination 54 forms an elevation 54.2 on the interior side 54.1 of the leg 6. This elevation 54.2 serves as a first attachment for the connecting element 1 while slipping the connecting element 1 onto a wall element 7. The elevation 54.2 thus forms a clamping means, which prevents the connecting element 1 from being able to fall off a narrow side 55, 56 while handling the wall components 47, see FIG. 4*a*.

In another embodiment, the elevation 54.2 can also consist of a defined ridge 45 on the sides facing the wall component 47. A depression 20.1 and a defined ridge 46 are shown based on the example of the punched hole 17.1, as representative for the other punched holes 16, 16.1, 17. The ridge 46 is provided with a tooth system (not shown), so that the ridge 46 acts like a latching means in relation to the wall component 47. The tooth system latches or claws its way into the surface of the wall component 47, as a result of which the connecting element 1 has a retaining effect relative to the wall component 47. However, other latching means are also conceivable. In the present example, a pop rivet 45 is located in the punched holes 17.1, 18.1 and the borehole 49. The job of the pop rivet 45 is to join the two legs 6, 6.1 of the U-shaped profile 3 of a connecting element 1 with a wall component 47. A known tool (setting tool) is used for establishing the connection, and need not be described in any more detail. When assembling a wall component using a connecting element, for example during roof extensions, a pull-through rivet with a thread or known screws, e.g., drywall screws (not shown), can be used instead of the pop rivet for fastening the connecting element, if a roof beam or rafter is located at the connecting point. During the general use of drywall screws in place of pop rivets, the diameters for the punched holes 15, 15.1, 16, 16.1, 17, 17.1, 18, 18.1 and depressions 19, 19.1, 20, 20.1 are adjusted according to the dimensions of the screws.

Figure 4A:
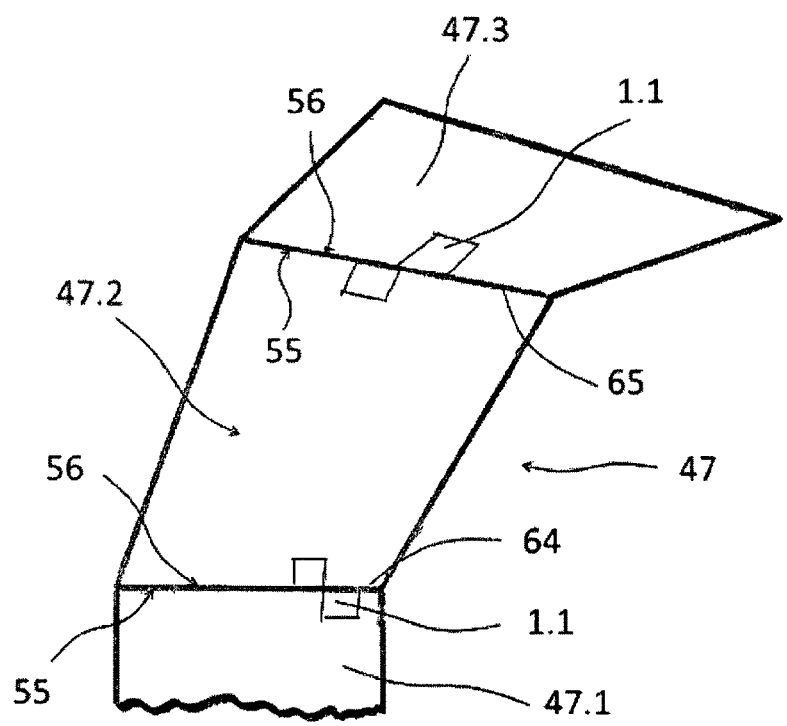
FIG. 4a, 4b schematically illustrate corner angle connecting element according to the invention for use in roof extension.
Figure 4B:
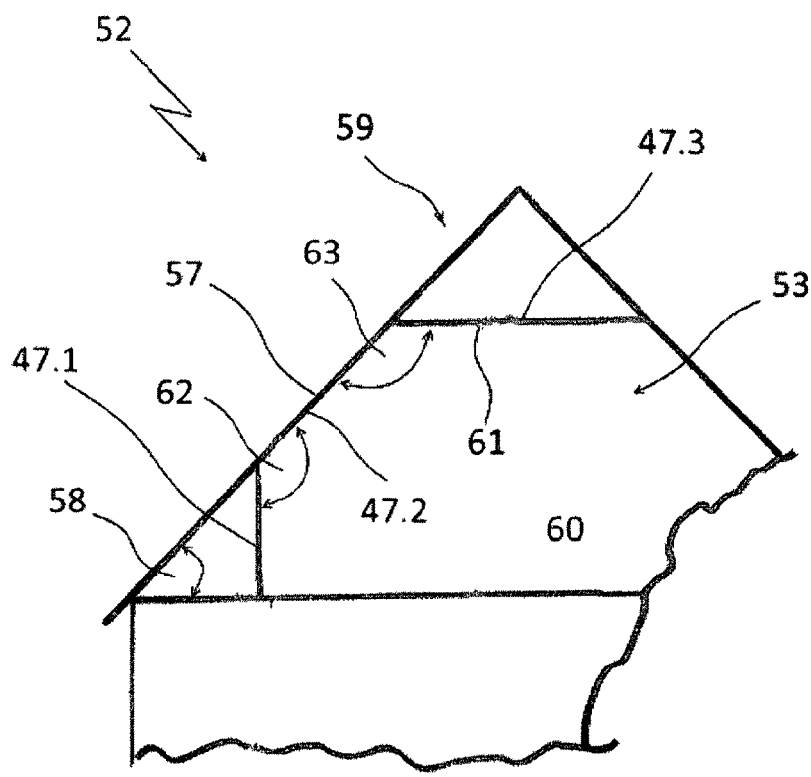

FIGS. 4*a* and 4*b* present a schematic illustration of a corner angle connecting element 1.1 or 1.2 according to the invention in use, for example during the roof extension 53 of a building 52. This case can involve a corner angle connecting element 1.1 according to FIG. 2*b* or a corner angle connecting element 1.2 according to FIG. 2c. Therefore, corresponding designations from FIGS. 1b, 2b and 2c are provided with the same reference numbers. An integral, flat punched part 7, 7.1 according to FIG. 1a, 1b is used as the basis for the corner angle connecting element 1.1, 1.2, preferably a punched part 7.1 according to FIG. 1b. As indicated in the descriptions above, the connecting element 1.1, 1.2 according to the invention essentially consists of a flat punched part 7, 7.1, which has a square or approximately square shape, and rounded corners. As described above, this corner angle connecting element 1.1, 1.2 is bent apart at the punched lines 9, 10 and angled along the bending lines 13, 13.1, 14, as a result of which a respective two pairs of legs 5, 5.1 and 6, 6.1 are turned into U-shaped profiles 2, 3.

According to FIG. 4a and FIG. 4b, such a corner angle connecting element 1.1, 1.2 is used for connecting panel-shaped components for interior construction, e.g., for covering walls, ceilings and/or fabricating lightweight walls. During the assembly of such wall components 47, these corner angle connecting elements 1 are preferably used in roof extensions 53 or anywhere that the narrow sides 55, 56 of the wall components 47 are not perpendicular, but rather abut against each other at a specific angle 58, the roof pitch angle α, just as in the case of roof pitches 57.

The roof pitch 57 is the steepness of a roof surface 59, which is indicated as an angle in degrees, the so-called roof pitch angle α 58. The roof pitch angle α 58 as a rule measures between 20 degrees and 80 degrees, preferably 45 degrees. As a rule, a roof extension 53 with wall components 47 so as to achieve a traversable room starts with the assembly of perpendicular wall components 47.1. Owing to the roof incline or roof pitch 57, these wall components 47.1 are then adjoined by wall components 47.2 whose narrow sides 56 abut against the narrow sides 55 of the perpendicularly arranged wall components 47.1 at a roof pitch angle α 58. The wall components 47.2 arranged on the roof incline 57 are then laid in the direction of the roof ridge, vertically, until a horizontal ceiling 61 comprised of wall components 47.3 can be put in. In other words, an angle γ 63 once again arises at the location where the narrow sides 55 of the wall components 47.2 arranged on the roof incline 57 come to abut against the narrow sides 56 of the wall components 47.3 arranged on the horizontal ceiling 61. This angle γ 63 between the roof incline 57 and horizontal ceiling 61 corresponds with the angle β 62 between the perpendicular wall components 47.1 and roof incline 57. Since these angles β 62 and γ 63 are congruent or identical in size, the same corner angle connecting elements 1.1 can be used at both seams 64, 65 of the adjoining wall components 47.1, 47.2, 47.3. The craftsman decides how many corner angle connecting elements 1.1 are arranged on the narrow sides 55, 56 for connecting wall components 47.1, 47.2, 47.3. Depending on the length and width of a wall component 47, several corner angle connecting elements 1.1, 1.2 are preferably used so as to increase the strength at the seams 55, 56 and avoid expansion cracks. Because the roof inclines 57 vary, corresponding corner angle connecting elements 1.1, 1.2 with different angles ϑ 66 between the legs 5, 6 of the U-shaped profiles 2, 3 are kept available. On FIGS. 4a and 4b, the angle ϑ 66 preferably measures 135 degrees for the corner angle connecting elements 1.1, 1.2, which corresponds to the angle 62, 63. These 135 degree corner angle connecting elements 1.1, 1.2 can have varying web widths 11. The web widths 11 are made up of the web 11 or the web 11 with the intermediate web 11.1, so that wall components 47 with different thicknesses can be accommodated, or varying distances between the legs 5, 5.1, 6, 6.1 of the U-profiles 2, 3 can be kept available.

REFERENCE LIST

| | |
|---|---|
| 1 | Connecting element |
| 1.1 | Corner angle connecting element |
| 1.2 | Corner angle connecting element |
| 2 | U-profile |
| 3 | U-profile |
| 4 | Web |
| 4.1 | Intermediate web |
| 5 | Leg (of 2) |
| 5.1 | Leg (of 2) |
| 6 | Leg (of 3) |
| 6.1 | Leg (of 3) |
| 7 | Punched part |
| 7.1 | Punched part |
| 7.2 | Punched part |
| 8 | Continuous line |
| 9 | Punched section |
| 10 | Punched section |
| 11 | Web width |
| 11.1 | Intermediate web width |
| 12 | Channel-shaped recess |
| 13 | Bending line |
| 13.1 | Bending line |
| 14 | Bending line |
| 15 | Punched hole |
| 15.1 | Punched hole |
| 16 | Punched hole |
| 16.1 | Punched hole |
| 17 | Punched hole |
| 17.1 | Punched hole |
| 18 | Punched hole |
| 18.1 | Punched hole |
| 19 | Depression |
| 19.1 | Depression |
| 20 | Depression |
| 20.1 | Depression |
| 21 | Depression |
| 22 | Front side |
| 23 | Outer edge |
| 24 | Outer edge |
| 25 | Flat part (of I) |
| 26 | Flat part (of II) |
| 27 | Flat part (of III) |
| 28 | Flat part (of IV) |
| 29 | Flat part (of 4) |
| 30 | V-cutout |
| 31 | V-cutout |
| 32 | Horizontal center line |
| 33 | Perpendicular center line |
| 34 | Distance (in I and IV) |
| 35 | Distance (in II and III) |
| 36 | Center line (15, 15.1, 18, 18.1) |
| 36.1 | Center line (18, 18.1) |
| 37 | Center line (16, 16.1, 17, 17.1) |
| 38 | Distance |
| 38.1 | Distance |
| 39 | Distance |
| 39.1 | Distance |
| 40 | Outer edge |
| 41 | Outer edge |
| 42 | Outer edge |
| 43 | Outer edge |
| 44 | Front side (control side) |
| 45 | Pop rivet |
| 46 | Ridge |
| 47 | Wall component |
| 47.1 | Wall component, perpendicular |
| 47.2 | Wall component, inclined |
| 47.3 | Wall component, horizontal |
| 48 | Center line |
| 49 | Borehole |
| 50 | Angle |
| 51 | Pop rivet head |
| 52 | Building |
| 53 | Roof extension |

| | |
|---|---|
| 54 | Incline |
| 54.1 | Interior side |
| 54.2 | Elevation |
| 55 | Narrow side |
| 56 | Narrow side |
| 57 | Roof pitch (inclination) |
| 58 | Angle |
| 59 | Roof surface |
| 60 | Room |
| 61 | Horizontal ceiling |
| 62 | Angle β |
| 63 | Angle γ |
| 64 | Seam |
| 65 | Seam |
| 66 | Angle ϑ |
| 67 | Angle ε |
| 67.1 | Angle ε |
| 68 | Angle φ |
| 68.1 | Angle φ |
| 69 | Angle θ |
| 70 | Center line (15, 16) |
| 71 | Center line (15.1, 16.1) |
| 72 | Center line (17, 18) |
| 73 | Center line (17.1, 18.1) |
| 74 | Center line |
| 75 | Center line |
| 76 | Distance (18 to 18.1) |
| 77 | Distance (17 to 17.1) |
| 78 | Distance (18.1 to 13) |
| 79 | Distance (17.1 to 14) |
| I | Quadrant |
| II | Quadrant |
| III | Quadrant |
| IV | Quadrant |

The invention claimed is:

1. A connecting element for connecting at least two wall components, the connecting element comprising:
a component having a double-U shape punched and molded out of a sheet metal part, said double-U shaped component formed from four surface parts which correspond to a first quadrant, a second quadrant, a third quadrant, and a fourth quadrant and a shared web, said double-U shaped component being comprised of two offset and opposing U-profiles having the shared web which is provided with a channel-shaped depression arranged symmetrically in the shared web,
wherein each said U-profiles consists of two respective legs spaced apart by a portion of said web, and which extend from the web in a perpendicular direction and in a direction 180 degrees away from each other,
the component formed from a flat, punched part made out of sheet steel having a geometric contour, which contains two punched sections spaced apart from each other and running on a continuous line from a respective outer edge to a middle of the punched part, which punched sections are arranged centrally relative to the contour, and whose distance from each other forms a web width corresponding to the thickness of a wall component,
wherein the web width runs in a perpendicular direction to the punched sections, forming the web,
wherein at least one punched hole is arranged in each of the first quadrant, second quadrant, third quadrant, and fourth quadrant,
wherein the punched holes located in the second quadrant and the third quadrant are provided with a recess, and
wherein the recess of the punched holes in the second quadrant is arranged on the front side, and the recess of the punched holes in the third quadrant is arranged on the rear side of the punched part so that in a ready bent state, the recesses of the punched holes in the second quadrant and the third quadrant point from an operating side of a U-profile toward an inner side;
wherein at least one of the punched holes provided with a recess together with another of at least one of the punched holes without recesses in the ready bent state form a respective pair of punched holes, which in the U-shaped profile stand perpendicular and spaced parallel part from each other by the web, and have a shared center line.

2. The connecting element according to claim 1, wherein the punched holes provided with a recess have an elevation or a defined ridge on an inner side of an opposite leg in the ready bent state of the connecting element.

3. The connecting element according claim 1, wherein at least one of the punched holes without recesses is arranged on a center line in the flat part, and at least another of the punched holes with recesses is also arranged on another center line in the flat part, wherein the center lines are spaced parallel apart from the main vertical center line and outer edge of a punched part, and spaced a parallel distance from the bending lines of a punched part.

4. The connecting element according claim 1, wherein a punched hole pair is arranged on a first center line in the flat part of a punched part, and a punched hole pair is arranged on a second center line in the flat part of a punched part, and a punched hole pair is arranged on a third center line in the flat part of a punched part, and a punched hole pair is arranged on a fourth center line in the flat part of a punched part, wherein the first through fourth center lines are spaced parallel apart from a main horizontal center line and outer edge, and spaced a distance apart from the main horizontal center line.

5. The connecting element according to claim 1, wherein the flat parts are offset in a perpendicular direction and run at an inclination opposite the web, and are angled at a respective acute angle φ of less than 90 degrees away from the web, as a result of which the two U-profiles extend at an obtuse angle ϑ in a direction facing away from each other and form a corner angle connecting element.

6. The connecting element according to claim 1, wherein the legs of the flat parts of a first U-profile are arranged at a right angle ε to the web, and the legs of the flat parts of a second U-profile arranged at an acute angle φ to the web, as a result of which the U-profiles extend at an obtuse angle ϑ in a direction facing away from each other and form a corner angle connecting element.

7. The connecting element according to claim 6, wherein an intermediate web is arranged between the flat part and web, from which the flat part is spaced apart by the web to form an asymmetric punched part.

8. The connecting element according to claim 7 wherein the flat part of the third quadrant is bent along the bending line by an angle of 45 degrees towards the operating side and forms a leg, wherein the intermediate web on the bending line is also bent by an angle of 90 degrees towards the operating side and is perpendicular to the web, and the flat part of the fourth quadrant adjoining the intermediate is also bent on the bending line by an angle and forms a leg which forms a U-shaped profile with the leg of the flat part because the bending angles of the legs of the second and third quadrants are congruent to the bending angles of the legs of the first and fourth quadrants.

* * * * *